(12) United States Patent
Nomura et al.

(10) Patent No.: US 12,608,099 B2
(45) Date of Patent: Apr. 21, 2026

(54) ACTIVE PEN CAPABLE OF INDICATING TRANSMISSION VOLTAGE AND POSITION DETECTION SYSTEM

(71) Applicant: Wacom Co., Ltd., Saitama (JP)

(72) Inventors: Yoshio Nomura, Saitama (JP); Masafumi Utsugi, Saitama (JP); Jun Kadowaki, Saitama (JP); Ryutaro Nitobe, Saitama (JP); Susumu Yamada, Saitama (JP); Haruhiko Hisano, Saitama (JP); Hideyuki Hara, Saitama (JP); Naoki Watanabe, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/810,327

(22) Filed: Aug. 20, 2024

(65) Prior Publication Data

US 2025/0068271 A1 Feb. 27, 2025

(30) Foreign Application Priority Data

Aug. 22, 2023 (JP) ................................. 2023-134848

(51) Int. Cl.
G06F 3/041 (2006.01)
G06F 3/0354 (2013.01)
G06F 3/038 (2013.01)

(52) U.S. Cl.
CPC ...... G06F 3/04162 (2019.05); G06F 3/03545 (2013.01); G06F 3/0383 (2013.01)

(58) Field of Classification Search
CPC .................................................. G06F 3/04162
See application file for complete search history.

(56) References Cited

U.S. PATENT DOCUMENTS

| | | | |
|---|---|---|---|
| 2019/0179429 A1* | 6/2019 | Yamamoto | G06F 3/0412 |
| 2020/0033961 A1* | 1/2020 | Shin | G06F 3/0346 |
| 2020/0081577 A1 | 3/2020 | Nomura et al. | |
| 2022/0057870 A1* | 2/2022 | Miyamoto | G06F 3/04162 |
| 2024/0031471 A1* | 1/2024 | Kang | A45C 11/00 |

FOREIGN PATENT DOCUMENTS

JP 6473554 B1 2/2019

* cited by examiner

*Primary Examiner* — Chun-Nan Lin
(74) *Attorney, Agent, or Firm* — Seed Intellectual Property Law Group LLP

(57) ABSTRACT

Provided is an active pen used with electronic equipment including a touch sensor that is of a capacitive system and that includes sensor electrodes, the active pen including a receiving circuit that receives an uplink signal from the electronic equipment, a transmitting circuit that transmits a downlink signal to the electronic equipment, an attendant function circuit that performs an attendant function different from reception of the uplink signal and transmission of the downlink signal, and a controller that controls operation of the receiving circuit, the transmitting circuit, or the attendant function circuit according to a plurality of kinds of operation modes including a normal mode and a low power consumption mode.

18 Claims, 19 Drawing Sheets

F I G . 3
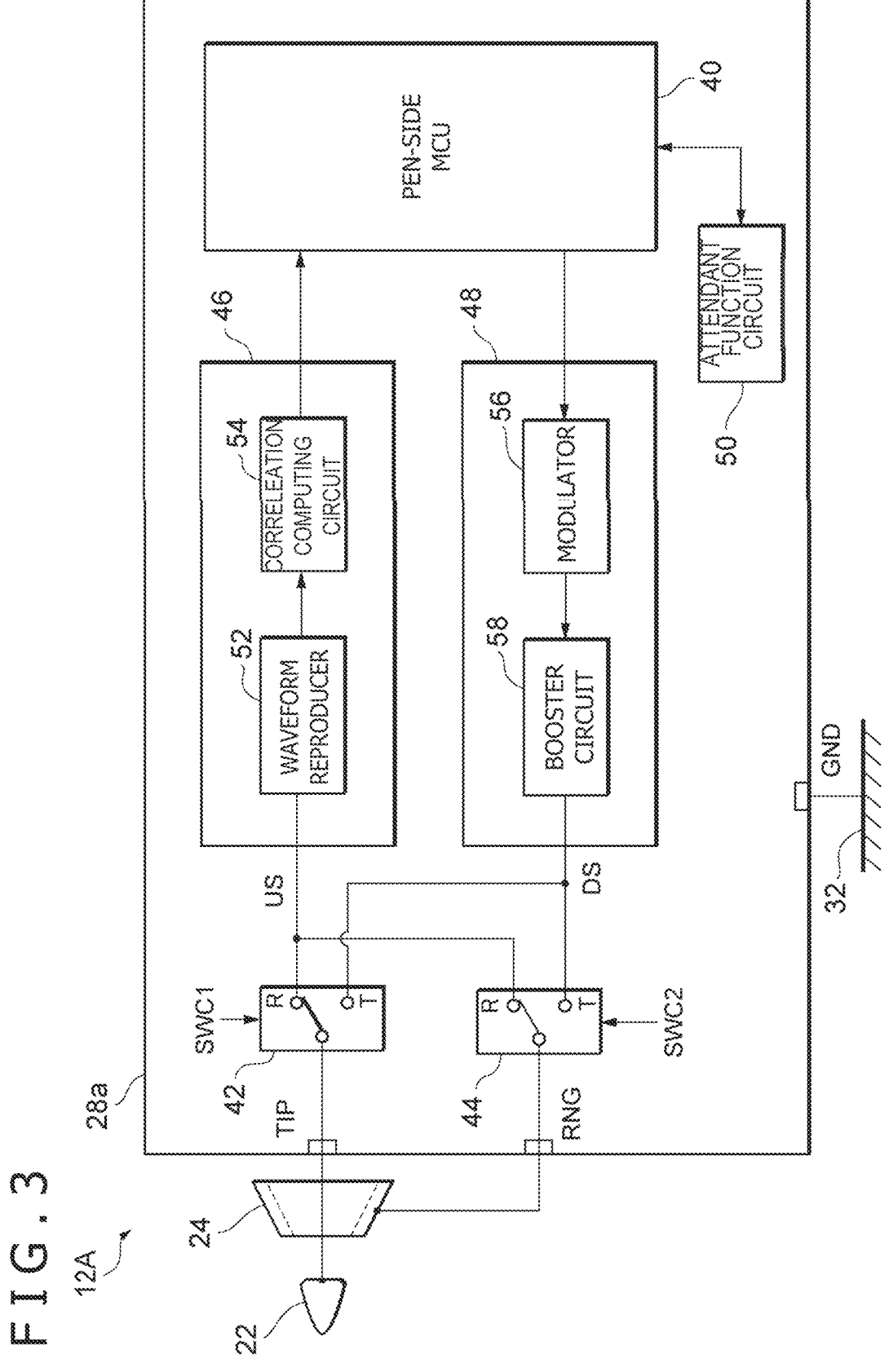

F I G . 7
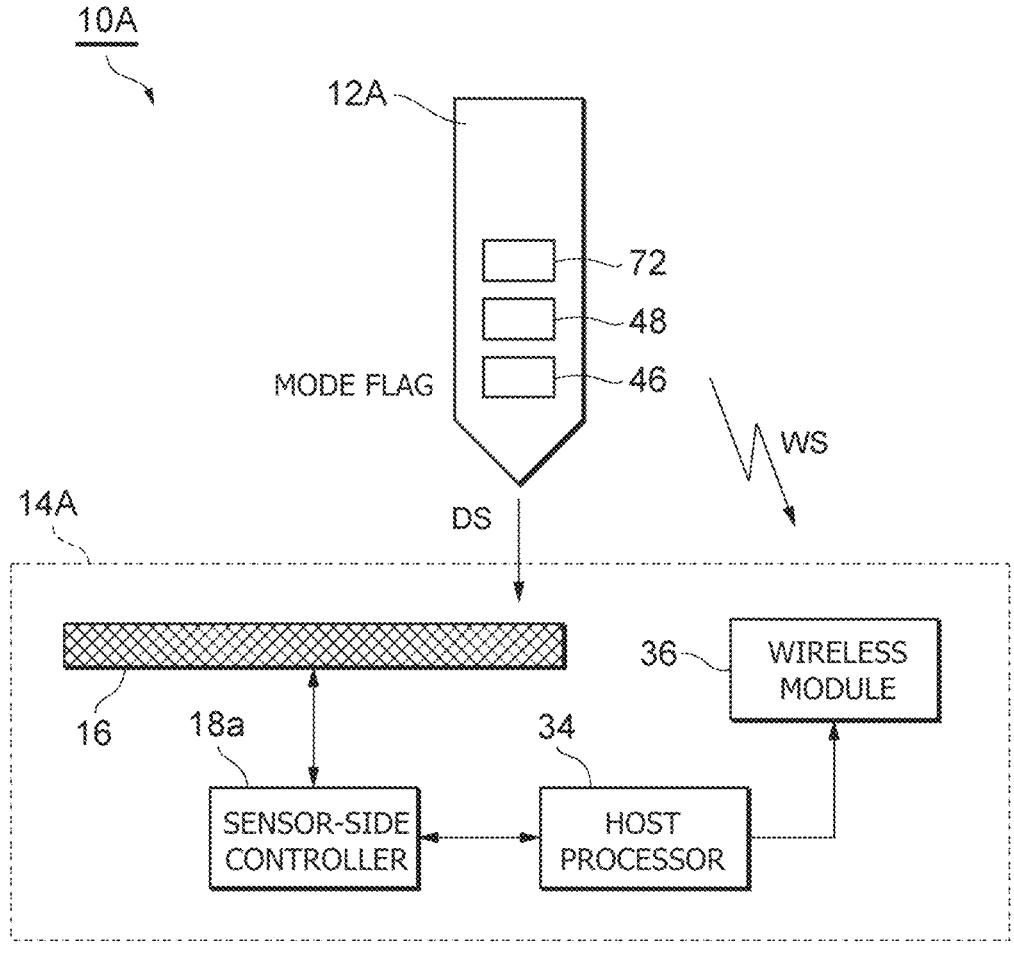

F I G . 9

| DRIVING OPERATION | NORMAL MODE | LOW CONSUMPTION MODE |
|---|---|---|
| BOOST | BOOST TO Vs1 | BOOST TO Vs2 (Vs2<Vs1) |
| TRANSMISSION | TRANSMISSION RATE R1 | TRANSMISSION RATE R2 (R2<R1) |
| FREQUENCY HOPPING | ON | OFF |
| RECEPTION | ON (BIDIRECTIONAL MODE) | OFF (UNIDIRECTIONAL MODE) |
| WIRELESS COMMUNICATION | ON | OFF |
| DETECTION OF WRITING PRESSURE | ON | OFF |
| DETECTION OF ANGLE | ON | OFF |
| OPERATION OF PEN SWITCH | VALID | INVALID |
| DATA WRITING | PERMITTED | LIMITED |

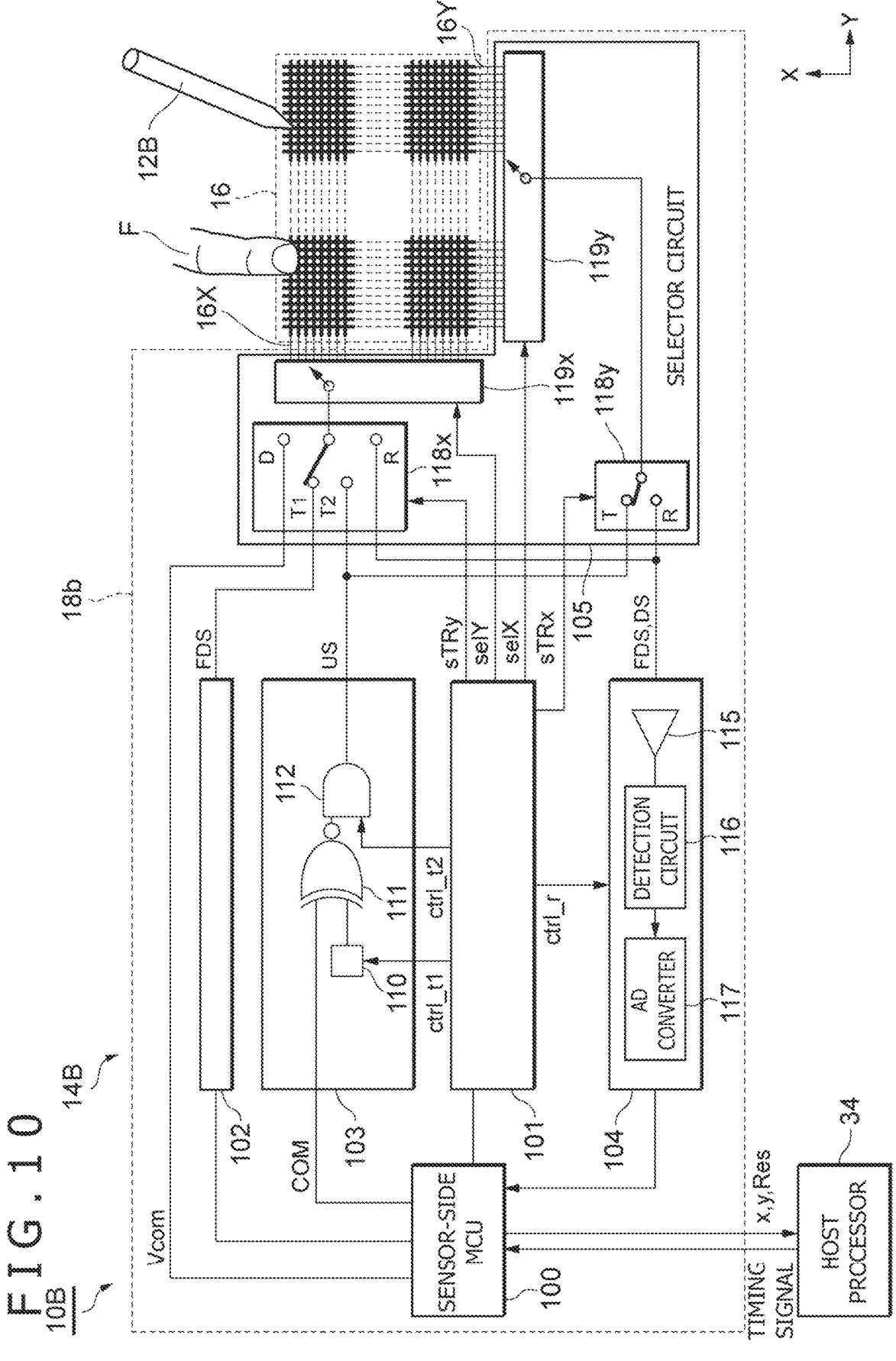
F I G . 1 0

| DRIVING OPERATION | NORMAL MODE | LOW CONSUMPTION MODE |
|---|---|---|
| TRANSMISSION | ON | OFF |
| RECEPTION | ON | OFF |
| THRESHOLD DETERMINATION OF RECEPTION LEVEL | SET TO THRESHOLD Th1 | SET TO THRESHOLD Th2 (Th2<Th1) |
| DETECTION OF PEN ANGLE | ON | OFF |

FIG. 15

F I G . 1 6
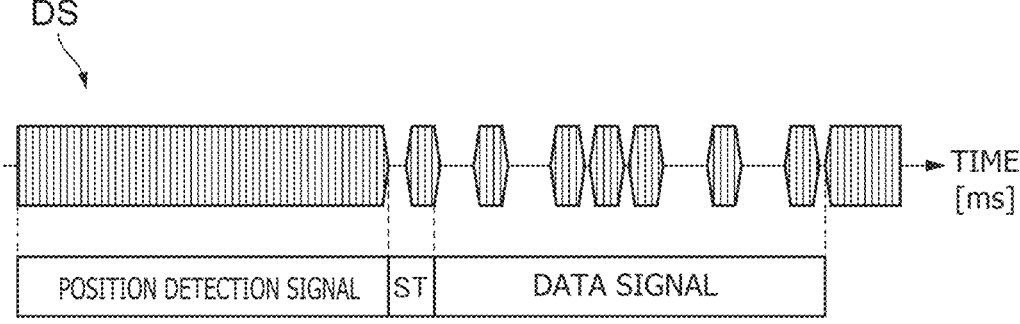
F I G . 1 7
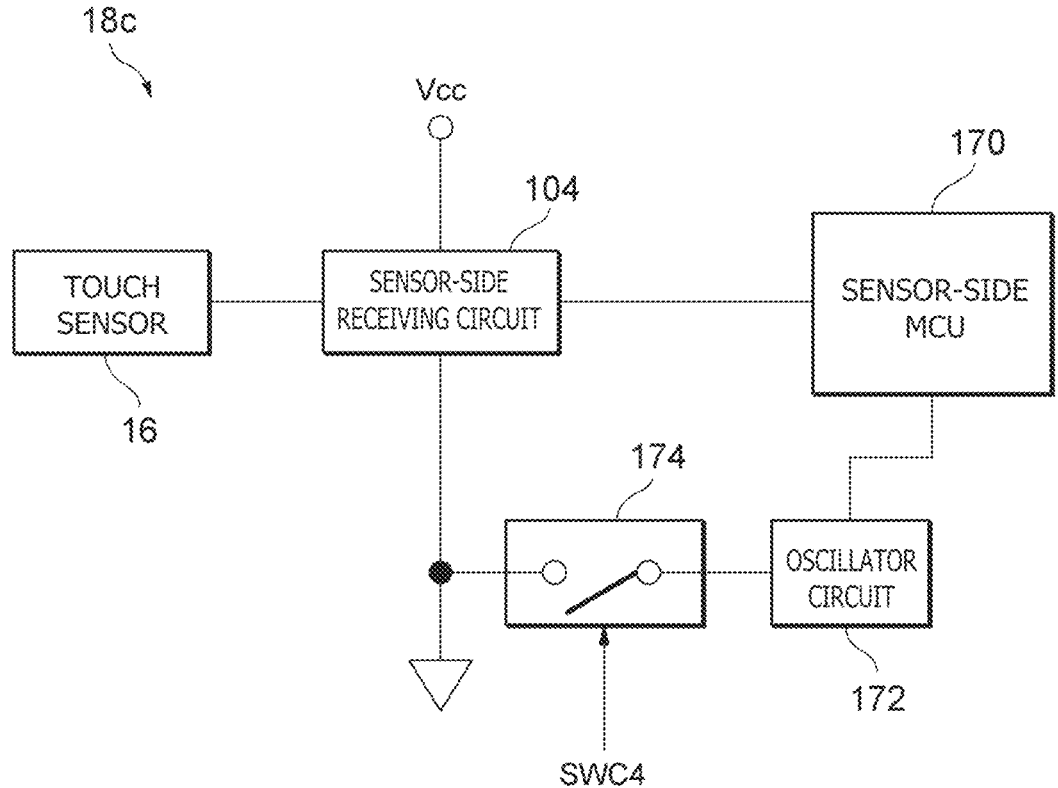

ACTIVE PEN CAPABLE OF INDICATING TRANSMISSION VOLTAGE AND POSITION DETECTION SYSTEM

BACKGROUND

Technical Field

The present disclosure relates to an active pen and a position detection system.

Description of the Related Art

As a related art, a position detection system composed of an active electronic pen (hereinafter, referred to as an "active pen") that is a position indicator with a built-in power supply and electronic equipment including a touch sensor has been known. In this kind of system, transmission and reception of signals between the active pen and the electronic equipment are carried out to perform exchange of data and synchronization of control (for example, refer to Japanese Patent No. 6473554).

However, there is a problem that the active pen is incapable of performing desired operation due to insufficiency of power when a user continues use of the active pen in a state in which the power remaining amount is low.

BRIEF SUMMARY

The present disclosure is what has been made in view of the above-described problem, and embodiments thereof provide an active pen and a position detection system that can perform various functions according to the status of the power remaining amount of the active pen.

An active pen in a first aspect of the present disclosure is used with electronic equipment including a touch sensor that is of a capacitive type and includes a plurality of sensor electrodes, the active pen including a receiving circuit that, in operation, receives an uplink signal from the electronic equipment, a transmitting circuit that, in operation, transmits a downlink signal to the electronic equipment, an attendant function circuit that, in operation, performs an attendant function different from reception of the uplink signal and transmission of the downlink signal, and a controller that, in operation, controls operation of the receiving circuit, the transmitting circuit, or the attendant function circuit according to a plurality of kinds of operation modes including a normal mode and a low power consumption mode, in which an occurrence rate of performance of a specific driving operation relating to at least one of reception of the uplink signal, transmission of the downlink signal, or the attendant function is higher in the normal mode than in the low power consumption mode or a performance amount of the specific driving operation is relatively large, and the low power consumption mode is the operation mode in which the occurrence rate of performance of the specific driving operation is larger in the normal mode than in the low power consumption mode.

A position detection system in a second aspect of the present disclosure includes a position detection system including an electronic equipment including a touch sensor that is of a capacitive type and that includes a plurality of sensor electrodes, and an active pen used with the electronic equipment, in which the active pen includes a pen-side receiving circuit that, in operation, receives an uplink signal from the electronic equipment, a pen-side transmitting circuit that, in operation, transmits a downlink signal corresponding to the uplink signal to the electronic equipment, and a pen-side controller that, in operation, controls driving operation by the pen-side receiving circuit or the pen-side transmitting circuit according to a plurality of kinds of operation modes including a normal mode and a low power consumption mode. In the normal mode, transmission of the downlink signal is continued, and in the low power consumption mode the transmission of the downlink signal is stopped and the active pen functions as a passive pointer.

A position detection system in a third aspect of the present disclosure includes a position detection system including an electronic equipment including a touch sensor that is of a capacitive type and that includes a plurality of sensor electrodes, an active pen used with the electronic equipment, and an informing circuit that is disposed in the electronic equipment or the active pen and that, in operation, explicitly or implicitly informs a user that a remaining amount of a power supply of the active pen is less than a threshold amount, in which the active pen includes a receiving circuit that, in operation, receives an uplink signal from the electronic equipment, a transmitting circuit that, in operation, transmits a downlink signal to the electronic equipment, an attendant function circuit that, in operation, performs an attendant function different from reception of the uplink signal and transmission of the downlink signal, and a controller that, in operation, controls operation of the receiving circuit, the transmitting circuit, or the attendant function circuit according to a plurality of kinds of operation modes including a normal mode and a low power consumption mode, an occurrence rate of performance of a specific driving operation relating to at least one of reception of the uplink signal, transmission of the downlink signal, or the attendant function is higher in the normal mode than in the low power consumption mod or a performance amount of the specific driving operation is relatively large, and the low consumption mode is larger in the normal mode than in the low power consumption mode.

According to the present disclosure, various functions according to the status of the power remaining amount of the active pen can be performed.

BRIEF DESCRIPTION OF THE SEVERAL VIEWS OF THE DRAWINGS

FIG. 3 is a block diagram of a pen-side controller of an active pen in a first embodiment;

FIG. 7 is a diagram schematically illustrating a second sharing method of the mode flag;

FIG. 9 is a diagram schematically illustrating differences of driving operation between the operation modes in the first embodiment;

FIG. 10 is a diagram illustrating one example of an internal configuration of electronic equipment in a second embodiment;

FIG. 15 is a first block diagram of a pen-side controller of an active pen in the second embodiment;

FIG. 16 is a diagram illustrating one example of the signal waveform of a downlink signal;

FIG. 17 is a diagram illustrating a major part of a circuit configuration for implementing pseudo activation;

DETAILED DESCRIPTION

An active pen and a position detection system in the present disclosure will be described with reference to the accompanying drawings. It is obvious that the present disclosure is not limited to the respective embodiments and modification examples to be described later and can be freely changed without departing from the gist of this disclosure. Alternatively, the respective configurations may be optionally combined in a range in which no contradiction is caused technically. Alternatively, the order of performance of the respective acts configuring a flowchart may be changed in a range in which no contradiction is caused technically.

Description of Position Detection System 10

Overall Configuration

Figure 1:
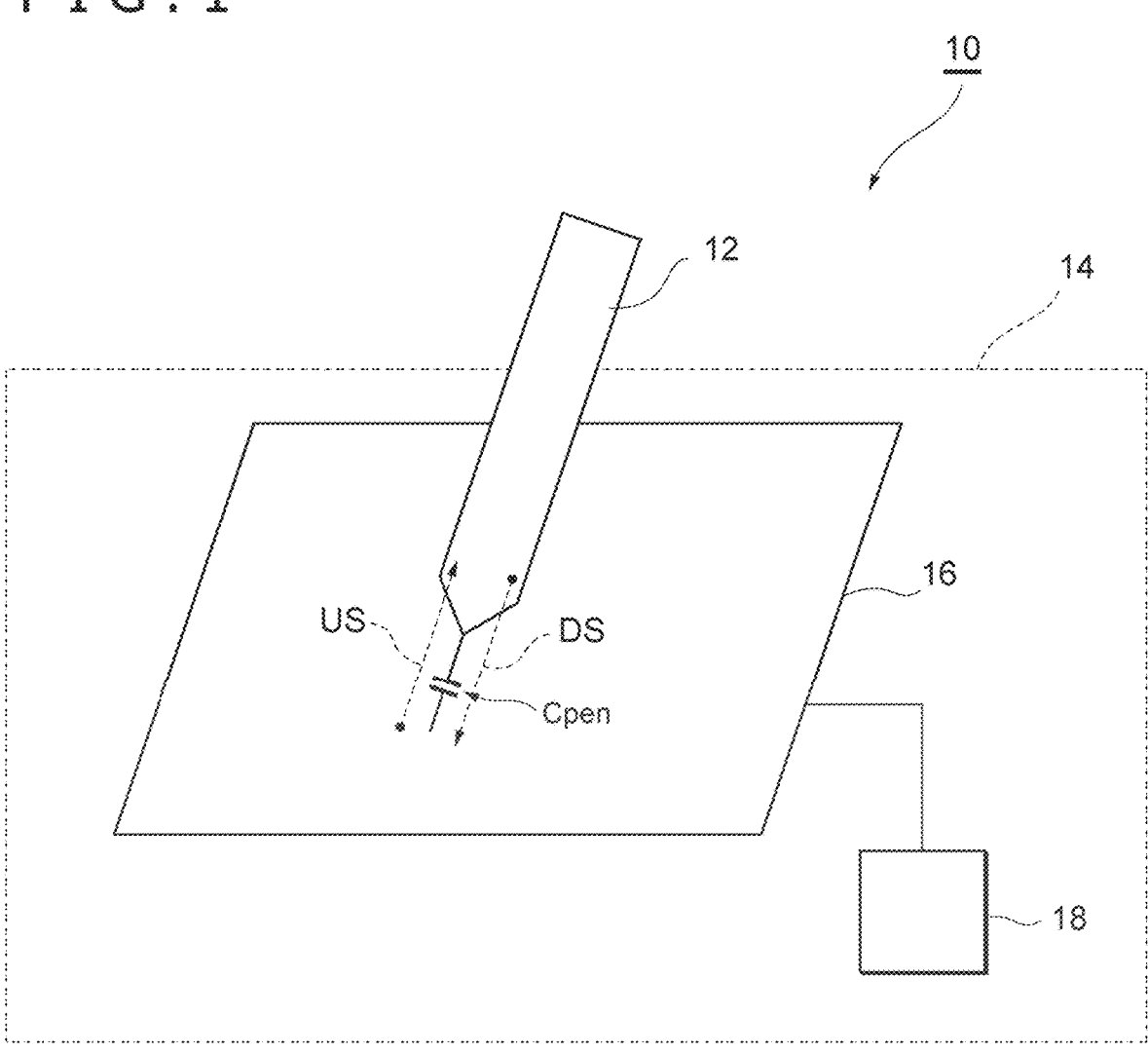
FIG. 1 is an overall configuration diagram of a position detection system common to the respective embodiments of the present disclosure.

FIG. 1 is an overall configuration diagram of a position detection system 10 common to the respective embodiments of the present disclosure. The position detection system 10 basically includes an active pen 12 and electronic equipment 14 used with this active pen 12.

The active pen 12 is a pen-type pointing device and is configured to be capable of unidirectionally or bidirectionally communicating with the electronic equipment 14. In this embodiment, the active pen 12 is a stylus of an "active system" that actively generates a signal from electrical energy stored in the active pen 12 and transmits this signal toward the electronic equipment 14 as a downlink signal DS. In the case of the active capacitive type (AES) system or the capacitive system, capacitive coupling of the active pen 12 and the electronic equipment 14 with each other is made by capacitance Cpen.

The electronic equipment 14 is a computer owned by a user and includes, for example, a tablet terminal, a smartphone, a personal computer, or the like that has/does not have a display function. Specifically, the electronic equipment 14 includes, besides a touch sensor 16 and a sensor-side controller 18, a host processor, a memory, a communication module, or a display panel (none is illustrated). The host processor performs generation processing of digital ink, display processing of a pointer, or the like by using position data sequentially output from the sensor-side controller 18.

For example, the touch sensor 16 is a sensor of a capacitive system (more specifically, a mutual capacitance system or a self-capacitance system) obtained by disposing a plurality of sensor electrodes in a planner manner. Each sensor electrode may be composed of a transparent electrically-conductive material containing indium tin oxide (ITO) or may be formed of a wire-mesh sensor. The touch sensor 16 may be a sensor of a "built-in type" (in further classification, an on-cell type or an in-cell type) configured integrally with a display panel that is not illustrated, or may be a sensor of an "external type" (or an out-cell type) attached to a display panel from the outside.

The sensor-side controller 18 is a control circuit that is connected to the touch sensor 16 and is for controlling communication with the active pen 12 through the touch sensor 16. Specifically, the sensor-side controller 18 transmits an uplink signal US toward the active pen 12 and receives the downlink signal DS from the active pen 12 to detect a position indicated by the active pen 12.

Device Configuration of Active Pen 12

Figure 2:
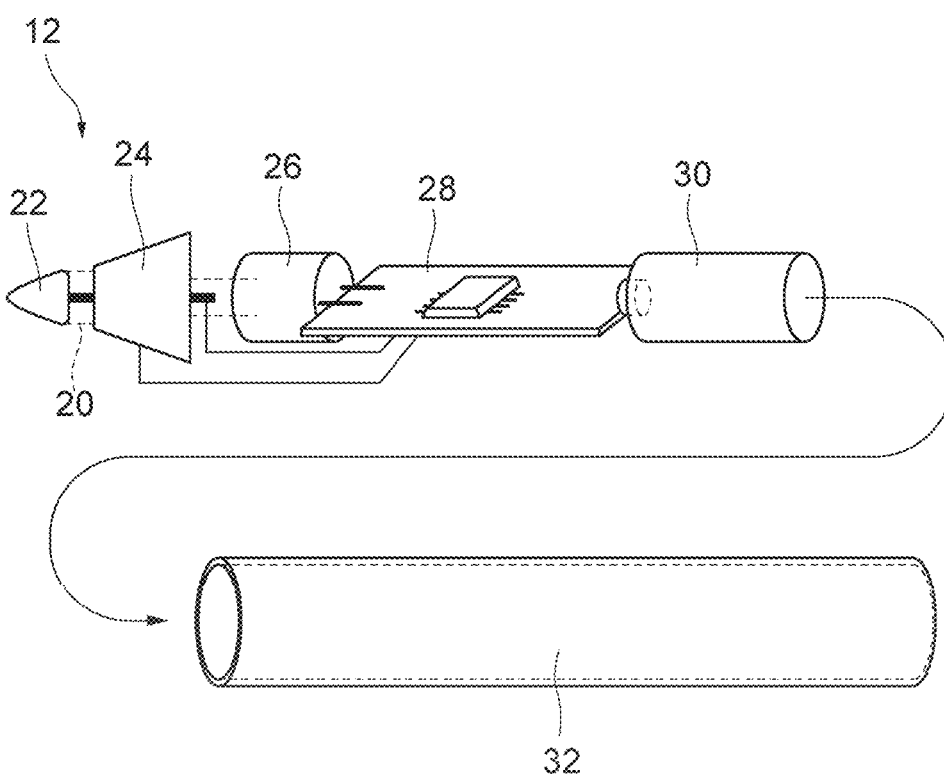
FIG. 2 is an exploded perspective view of an active pen illustrated in FIG. 1.

FIG. 2 is an exploded perspective view of the active pen 12 illustrated in FIG. 1. This active pen 12 includes a core 20, a tip electrode 22 (equivalent to a "pen electrode"), a ring electrode 24 (equivalent to a "pen electrode"), a writing pressure sensor 26, a pen-side controller 28, a power supply module 30 (equivalent to a "power supply"), and a casing 32.

The core 20 is a bar-shaped component disposed along the pen axis of the active pen 12. The tip electrode 22 and the ring electrode 24 are each composed of an electrically-conductive material such as metal or each contain an electrically-conductive material. Specifically, the tip electrode 22 is a conical electrode attached to the tip of the core 20. Furthermore, the ring electrode 24 is a tapered ring-shaped electrode in which the diameter gradually becomes smaller toward the tip side.

The writing pressure sensor 26 is physically connected to the core 20 and is configured to be capable of detecting an amount of writing pressure that acts on the tip side of the core 20 (that is, a pen tip). As the detection system of the writing pressure sensor 26, for example, a capacitive system, a resistive film system, a piezoelectric element system, an optical system, or a micro electro-mechanical system (MEMS) system is used.

The pen-side controller 28 includes a single or multiple boards configuring an electrical circuit for operating the active pen 12. The power supply module 30 is formed of, for example, a battery or a capacitor and supplies driving power to electronic parts or electronic elements on the pen-side controller 28. The casing 32 is configured to be capable of housing the above-described constituent parts.

First Embodiment

First, a position detection system 10A in a first embodiment will be described with reference to FIG. 3 to FIG. 9. The position detection system 10A is equivalent to one mode of the position detection system 10 illustrated in FIG. 1. This position detection system 10A includes an active pen 12A and electronic equipment 14A.

Block Diagram of Pen-Side Controller 28*a*

FIG. 3 is a block diagram of a pen-side controller 28*a* of the active pen 12A in the first embodiment. Disposed in this pen-side controller 28*a* are a micro controller (hereinafter, referred to as a "pen-side MCU 40"), a first switch 42, a second switch 44, a pen-side receiving circuit 46, a pen-side transmitting circuit 48, and an attendant function circuit 50.

The pen-side MCU 40 (equivalent to a "pen-side controller") is a unit that performs comprehensive control over the parts of the active pen 12A. The pen-side MCU 40 is configured to be capable of receiving the uplink signal US from the electronic equipment 14A by performing desired reception control over the pen-side receiving circuit 46. The pen-side MCU 40 is configured to be capable of transmitting the downlink signal DS to the electronic equipment 14A by performing desired digital signal processing for data supplied from the pen-side receiving circuit 46 and performing desired transmission control over the pen-side transmitting circuit 48.

The first switch 42 is a switch element configured in such a manner that a common terminal is connected to either one of an R-terminal and a T-terminal. The common terminal of the first switch 42 is connected to the tip electrode 22. The R-terminal is connected to an input end of the pen-side receiving circuit 46. The T-terminal is connected to an output end of the pen-side transmitting circuit 48. The pen-side MCU 40 supplies a first switch control signal SWC1 to the first switch 42 to perform switching control. This causes selective performance of reception of the uplink signal US and transmission of the downlink signal DS.

The second switch 44 is a switch element configured in such a manner that a common terminal is connected to either one of an R-terminal and a T-terminal. The common terminal of the second switch 44 is connected to the ring electrode 24. The R-terminal is connected to the input end of the pen-side receiving circuit 46. The T-terminal is connected to the output end of the pen-side transmitting circuit 48. The pen-side MCU 40 supplies a second switch control signal SWC2 to the second switch 44 to perform switching control. This causes reception of the uplink signal US and transmission of the downlink signal DS to be selectively performed.

The pen-side receiving circuit 46 is a circuit that demodulates the uplink signal US induced to the tip electrode 22 or the ring electrode 24 and outputs data resulting from the demodulation to the pen-side MCU 40. A ground end of the pen-side receiving circuit 46 is grounded to the casing 32 of the active pen 12A. Specifically, this pen-side receiving circuit 46 includes a waveform reproducer 52 and a correlation computing circuit 54.

The waveform reproducer 52 binarizes the level of a voltage induced to the tip electrode 22 or the ring electrode 24 by a clock at a predetermined rate and performs shaping into a binary string of positive and negative polarity values (that is, chip sequence) to output the chip sequence. This clock frequency is set to an integral multiple of the chip rate of the spreading code, for example.

The correlation computing circuit 54 stores the chip sequence from the waveform reproducer 52 in a register and performs correlation computation with the spreading code while sequentially shifting the chip sequence by the clock. This decodes the chip sequence included in the uplink signal US.

The pen-side transmitting circuit 48 is a circuit that generates the downlink signal DS according to control by the pen-side MCU 40. The pen-side transmitting circuit 48 outputs a carrier signal without modulation when the downlink signal DS is a "position signal," and modulates the carrier signal by using data for transmission and outputs the resulting signal when the downlink signal DS is a "data signal." Specifically, this pen-side transmitting circuit 48 includes a modulator 56 and a booster circuit 58.

The modulator 56 generates a carrier signal of a rectangular wave, a triangular wave, or the like and outputs the carrier signal in a modulated state or as it is on the basis of control by the pen-side MCU 40. When a burst signal is to be transmitted, the modulator 56 outputs the carrier signal as it is without modulation according to an instruction by the pen-side MCU 40. On the other hand, the modulator 56 at the time of data signal transmission modulates (on-off-keying (OOK), Pre-Shared Key (PSK), or the like) the carrier signal by data supplied from the pen-side MCU 40 and outputs the modulated signal obtained as the result thereof.

The booster circuit 58 generates the downlink signal DS by boosting the output signal supplied from the modulator 56 to a certain amplitude. The downlink signal DS generated by the booster circuit 58 is sent out to the external from the tip electrode 22 through the first switch 42 or from the ring electrode 24 through the second switch 44.

The attendant function circuit 50 is configured to be capable of exerting functions (hereinafter, referred to as "attendant functions") that are functions different from reception of the uplink signal US or transmission of the downlink signal DS and are attendant on basic functions relating to pen input. The attendant function circuit 50 may be part of the configuration of the pen-side controller 28*a* or may be a configuration separate from the pen-side controller 28*a* instead of or in conjunction with this.

Functional Block Diagram

Figure 4:
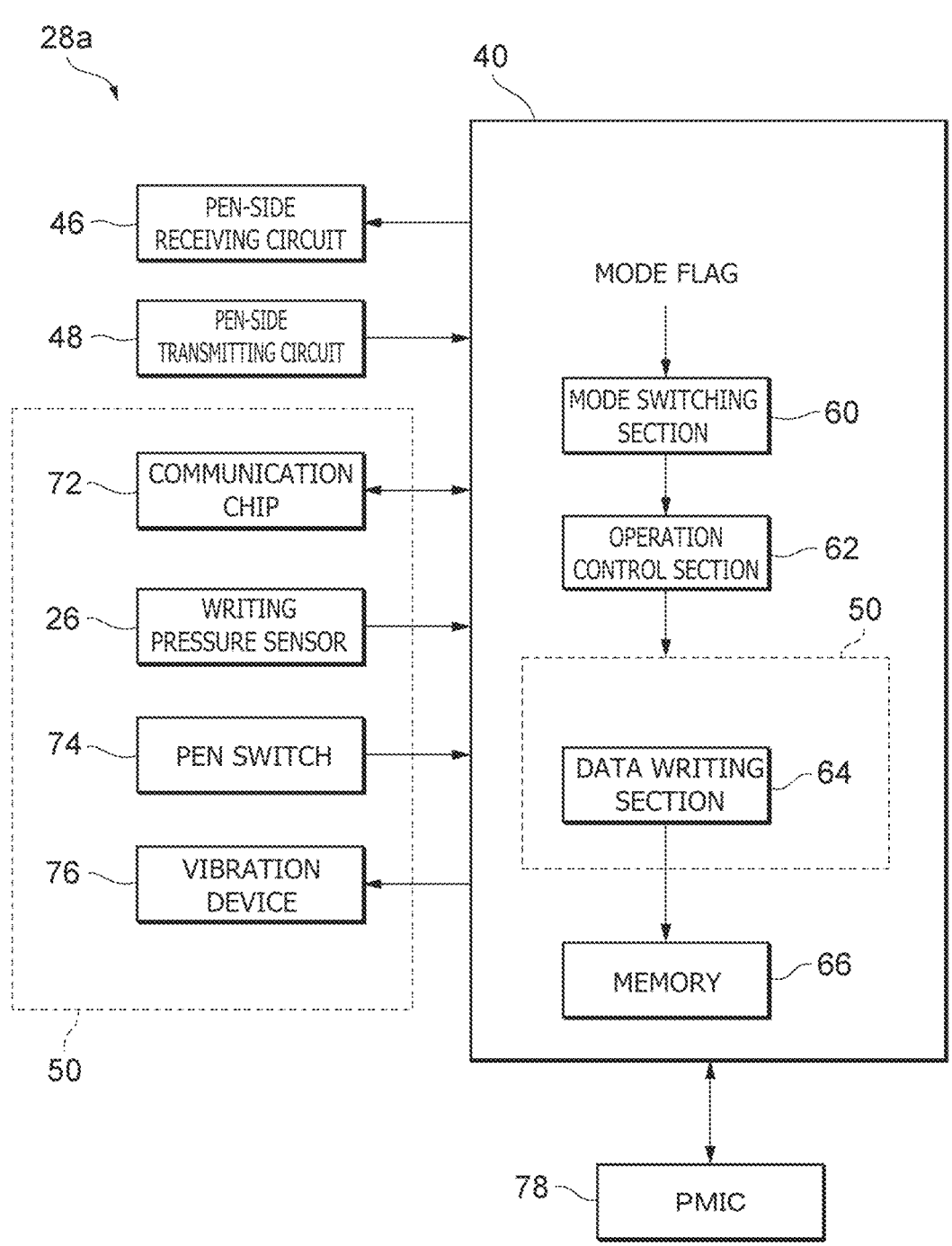
FIG. 4 is a functional block diagram relating to a pen-side micro controller (MCU) illustrated in FIG. 3.

FIG. 4 is a functional block diagram relating to the pen-side MCU 40 illustrated in FIG. 3. The pen-side MCU 40 includes a mode switching section 60, an operation control section 62, a data writing section 64, and a data storing section 66 (equivalent to a "memory"). Moreover, to the pen-side MCU 40, a communication chip 72, a pen switch 74, a vibration device 76, and a power management integrated circuit (hereinafter, referred to as a "PMIC 78") are each connected besides the above-described writing pressure sensor 26 (FIG. 2) and pen-side receiving circuit 46 and pen-side transmitting circuit 48 (FIG. 3). Here, the writing pressure sensor 26, the communication chip 72, the pen switch 74, the vibration device 76, and the data writing section 64 are equivalent to the attendant function circuit 50 that performs various attendant functions.

The mode switching section 60 makes switching among a plurality of kinds of operation modes to perform the operation mode by using mode information including a mode flag. For example, the kinds of operation modes are classified into [1] a "first operation mode group" in which the operation mode is switched according to a detection result of the active pen 12A or a passive pointer or [2] a "second operation mode group" in which the operation mode is switched according to the remaining amount of a power supply disposed in the active pen 12A.

For example, included in the first operation mode group are [1] a "simultaneous pen touch (STP) mode" in which the position of each of the active pen 12A and the passive pointer is detected in a time-sharing manner or [2] an "exclusive mode" in which detection of the passive pointer is temporarily stopped and the position of only the active pen 12A is detected.

In the second operation mode group, a normal mode or a low power consumption mode are included. Here, the "normal mode" means an operation mode in which the power consumption accompanying driving operation relating to at least one of reception of the uplink signal US, transmission of the downlink signal DS, and the attendant functions (hereinafter, referred to as "specific driving operation") is relatively high (e.g., greater than a threshold rate or amount). Furthermore, the "low power consumption mode" means an operation mode in which the power consumption accompanying the specific driving operation is relatively low (e.g., less than a threshold consumption rate or amount). For example, in the "normal mode," the occurrence rate of performance of the specific driving operation may be set relatively high, or the performance amount of the specific driving operation may be set relatively large (e.g., greater than a threshold amount). Moreover, in the "low power consumption mode," the occurrence rate of performance of the specific driving operation may be set relatively low, or the performance amount of the specific driving operation may be set relatively small low (e.g., less than a threshold rate or amount).

The mode switching section 60 may detect the operation mode of the electronic equipment 14A on the basis of the uplink signal US received through the pen-side receiving circuit 46 and switch the operation mode of the active pen 12A according to the detection result. For example, when detecting that the electronic equipment 14A is performing the low power consumption mode, the mode switching section 60 may make transition to the low power consumption mode to make an association with the electronic equipment 14A. Alternatively, when detecting that the electronic equipment 14A has returned to the normal mode from the low power consumption mode, the mode switching section 60 may return to the normal mode to make an association with the electronic equipment 14A.

The operation control section 62 performs operation control over the pen-side receiving circuit 46, the pen-side transmitting circuit 48, and the attendant function circuit 50 according to the operation mode selected by the mode switching section 60. The operation control section 62 performs the operation control while changing a driving parameter relating to the specific driving operation according to the selected operation mode. As one example of the "specific driving operation," various kinds of operation relating to [1] boost operation of the downlink signal DS, [2] transmission operation of the downlink signal DS, [3] frequency hopping operation of the downlink signal DS, [4] reception operation of the uplink signal US, or [5] the attendant functions are cited. The operation control section 62 may cause behavior triggered by reception of the uplink signal US to be different between the case in which the normal mode is being performed and the case in which the low power consumption mode is being performed.

The data writing section 64 exerts a function of writing the necessary data (for example, firmware) supplied through communication with the electronic equipment 14A to the data storing section 66 (hereinafter, a writing function). This data may be acquired through reception of the uplink signal US or may be acquired through reception of a wireless signal WS. As the driving parameter, [1] permission/prohibition of writing, [2] the time, the memory area, and the data amount assigned to writing, or the like is cited.

The pen-side receiving circuit 46 performs a reception function to receive the uplink signal US from the electronic equipment 14A. As the driving parameter, [1] validity/invalidity of reception, [2] the occurrence rate of reception, or the like is cited. In this "invalidation of reception," stop of reception operation or stop of processing of received data is included.

The pen-side transmitting circuit 48 performs a transmission function to transmit the downlink signal DS to the electronic equipment 14A. As the driving parameter, [1] validity/invalidity of transmission, [2] the transmission voltage (voltage value, whether or not a boost is made), [3] the width of a rectangular pulse, [4] the occurrence rate of transmission, [5] continuation/stop of frequency hopping, [6] the clock frequency, or the like is cited. In this "invalidation of transmission," stop of generation of the downlink signal DS or stop of transmission operation is included.

The writing pressure sensor 26 performs a writing pressure detection function to detect the writing pressure that acts on the pen tip. As one example of the driving parameter, [1] validity/invalidity of detection, [2] the occurrence rate of detection of the writing pressure, or the like is cited. In this "invalidation of detection," stop of output of a detection signal or stop of transmission of a writing pressure value is included.

The communication chip 72 performs a communication function to communicate with the electronic equipment 14A by a communication system (a wired or a wireless manner) different from the capacitive coupling system. As one example of the communication system, Universal Serial Bus (USB), Bluetooth (registered trademark), near field communication (NFC), or the like is cited. As one example of the driving parameter, [1] continuation/stop of communication, [2] the kind of communication mode, or the like is cited.

The pen switch 74 performs an operation detection function to detect a state of operation by a user. As one example of the driving parameter, [1] validity/invalidity of operation, [2] identification information of a switch regarding which operation is valid, or the like is cited.

The vibration device 76 performs a vibration function to vibrate the active pen 12A in order to reproduce an analog-like feeling of writing. As one example of the driving parameter, [1] validity/invalidity of vibration, [2] the vibration time and the vibration level, or the like is cited.

The PMIC 78 is an integrated circuit for monitoring the state of the power supply module 30 (FIG. 2) and supplying power to the pen-side controller 28a. The PMIC 78 sequentially measures the power remaining amount of the power supply module 30 and supplies the power remaining amount to the pen-side controller 28a.

Description of Operation

Figure 5:
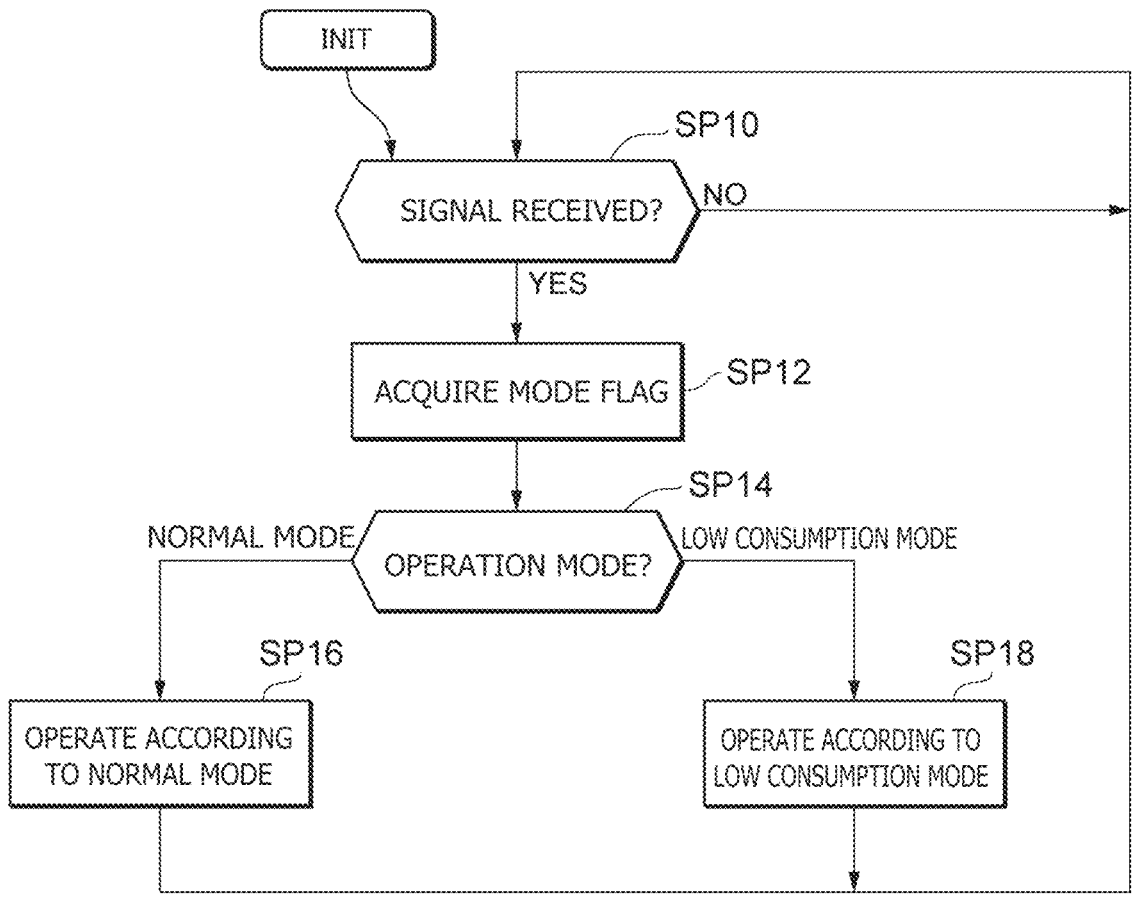
FIG. 5 is a flowchart illustrating one example of mode switching operation by the pen-side controller in FIG. 3 and FIG. 4.

The position detection system 10A in the first embodiment is configured as above. Subsequently, operation of the position detection system 10A will be described with reference to FIG. 5 to FIG. 9. FIG. 5 is a flowchart illustrating one example of mode switching operation by the pen-side controller 28a in FIG. 3 and FIG. 4.

At SP10, the pen-side controller 28a checks whether or not a signal has been received from the electronic equipment 14A. When a signal has not yet been received (SP10: NO), the pen-side controller 28a remains at SP10 until a signal is received. On the other hand, when a signal has been received (SP10: YES), the pen-side controller 28a proceeds to SP12.

At SP12 in FIG. 5, the mode switching section 60 acquires a mode flag included in the signal received at SP10.

Figure 6:
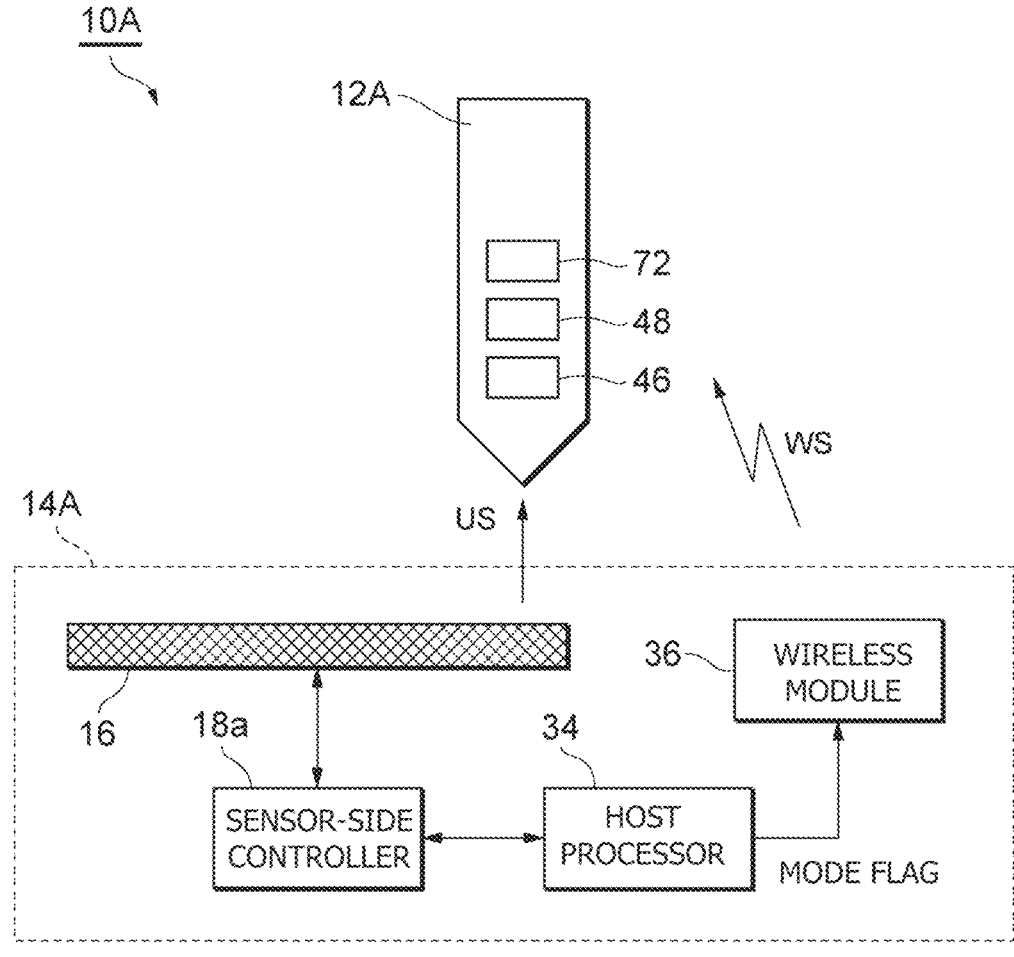
FIG. 6 is a diagram schematically illustrating a first sharing method of a mode flag.

FIG. 6 is a diagram schematically illustrating a first sharing method of the mode flag. The first sharing method corresponds to a method in which the electronic equipment 14A generates the mode flag and then provides the mode flag to the active pen 12A. Here, as the configuration of the electronic equipment 14A, the touch sensor 16, a sensor-side controller 18a, a host processor 34, and a wireless module 36 are illustrated. Furthermore, as the configuration of the active pen 12A, the pen-side receiving circuit 46, the pen-side transmitting circuit 48, and the communication chip 72 are illustrated.

First, the host processor 34 of the electronic equipment 14A acquires data including the power remaining amount of the active pen 12A through communication with the active pen 12A and generates the mode flag indicating the operation mode that should be performed.

When communication by the active capacitance type system is used, the sensor-side controller 18a of the electronic equipment 14A generates the uplink signal US modulated by data including the mode flag and transmits the uplink signal US from the sensor electrode forming the touch sensor 16. Thereafter, the active pen 12A receives the uplink signal US through the pen-side receiving circuit 46 and acquires the data including the mode flag through demodulation of the uplink signal US. In this manner, the mode flag is acquired by the active pen 12A.

When wireless communication different from the active capacitance type system is used, the sensor-side controller 18a of the electronic equipment 14A generates the wireless signal WS modulated by data including the mode flag and transmits the wireless signal WS from the wireless module 36. Thereafter, the active pen 12A receives the wireless signal WS through the communication chip 72 and acquires the data including the mode flag through demodulation of the wireless signal WS. In this manner, the mode flag is acquired by the active pen 12A.

FIG. 7 is a diagram schematically illustrating a second sharing method of the mode flag. The second sharing method corresponds to a method in which the active pen 12A generates the mode flag and then provides the mode flag to the electronic equipment 14A.

First, the active pen 12A acquires its own power remaining amount and generates the mode flag indicating the operation mode that should be performed. Then, the active pen 12A supplies the mode flag to the host processor 34 of the electronic equipment 14A through transmission of the downlink signal DS or the wireless signal WS modulated by data including the mode flag. Note that the active pen 12A does not yet perform switching of the operation mode at this timing.

When communication by the active capacitance type system is used, the sensor-side controller 18a of the electronic equipment 14A generates the uplink signal US modulated by data including the mode flag and transmits the uplink signal US from the sensor electrode forming the touch sensor 16. Thereafter, the active pen 12A receives the uplink signal US through the pen-side receiving circuit 46 and acquires the data including the mode flag through demodulation of the uplink signal US. In this manner, the mode flag is acquired by the active pen 12A.

When wireless communication different from the active capacitance type system is used, the sensor-side controller 18a of the electronic equipment 14A generates the wireless signal WS modulated by data including the mode flag and transmits the wireless signal WS from the wireless module 36. Thereafter, the active pen 12A receives the wireless signal WS through the communication chip 72 and acquires the data including the mode flag through demodulation of the wireless signal WS. In this manner, the mode flag is acquired by the active pen 12A.

At SP14 in FIG. 5, the mode switching section 60 refers to the value of the mode flag acquired at SP12 and selects one kind of operation mode from the plurality of kinds of operation modes. When the "normal mode" is selected (SP14: normal mode), the mode switching section 60 proceeds to SP16.

At SP16, the operation control section 62 performs operation control of the parts according to the normal mode selected at SP14. Thereafter, the pen-side controller 28a returns to SP10 and repeatedly performs SP10, SP12, SP14, and SP16 while the normal mode continues.

When a return to SP14 is made and the "low power consumption mode" is selected (SP14: low power consumption mode), the mode switching section 60 proceeds to SP18.

At SP18, the operation control section 62 performs operation control of the parts according to the low power consumption mode selected at SP14. Thereafter, the pen-side controller 28a returns to SP10 and repeatedly performs SP10, SP12, SP14, and SP18 while the low power consumption mode continues.

In this manner, the pen-side controller 28a dynamically switches the operation mode of the active pen 12A by repeatedly performing SP10 to SP18 in FIG. 5.

Figure 8:
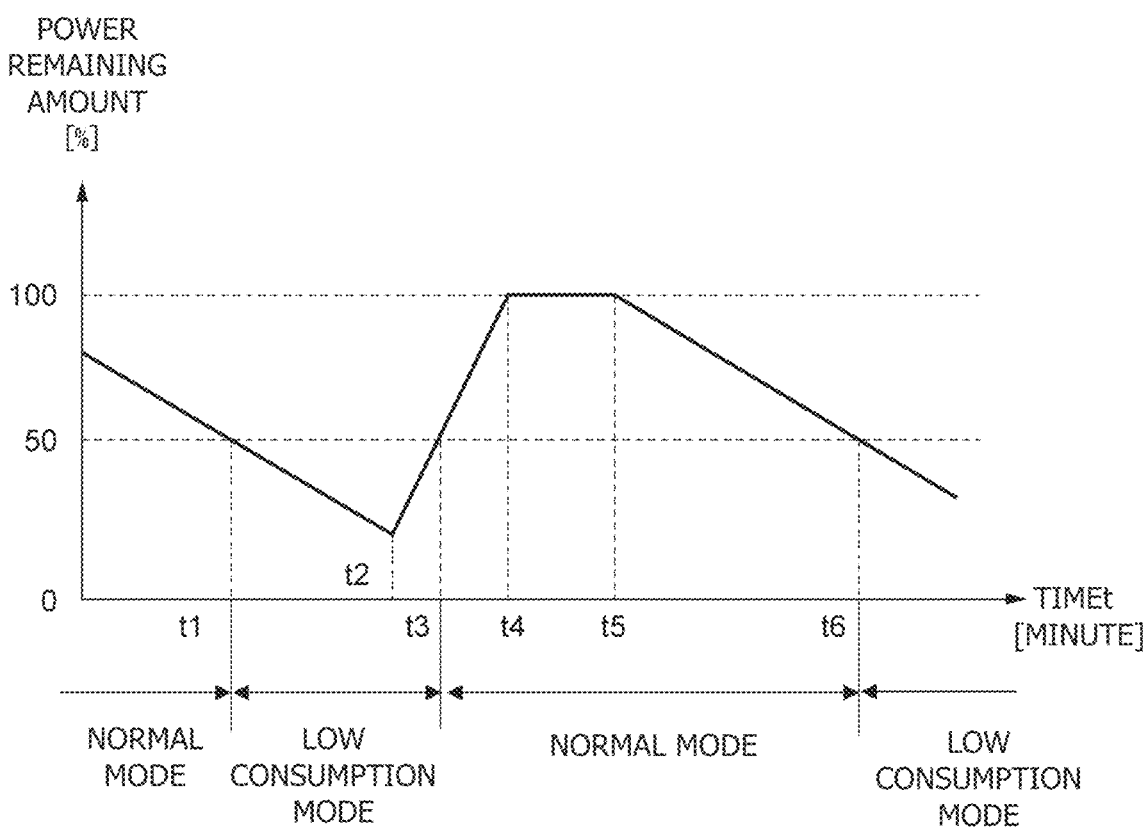
FIG. 8 is a diagram illustrating one example of a selection result of an operation mode.

FIG. 8 is a diagram illustrating one example of the selection result of the operation mode. The abscissa axis of the graph indicates a time t (unit: minute), and the ordinate axis of the graph indicates the power remaining amount (unit: %). Here, the case in which the threshold of the power remaining amount for switching the operation mode is set to "50%" is assumed.

First, the normal mode is performed while the power remaining amount is higher than 50% when t<t1. Thereafter, the use of the active pen 12A is continued, and switching from the normal mode to the low power consumption mode is performed with the lowering of the power remaining amount to 50% at t=t1 being the trigger. At a timing when the power remaining amount has become low after gradually lowering (t=t2), a charge of the power supply module 30 is started. Switching from the low power consumption mode to the normal mode is performed with the recovery of the power remaining amount to 50% at t=t3 being the trigger.

Thereafter, after the power remaining amount has become 100% (t=t4), the use of the active pen 12A is resumed (t=t5). The normal mode is performed while the power remaining amount is higher than 50% when t5<t<t6. Thereafter, the use of the active pen 12A is continued, and switching from the normal mode to the low power consumption mode is performed with the lowering of the power remaining amount to 50% at t=t6 being the trigger. As above, even when use of the active pen 12A is continued in the state in which the power remaining amount is small, the active pen 12A can be used for a longer period of time due to the automatic transition to the low power consumption mode.

Comparison Between Normal Mode and Low Power Consumption Mode

FIG. 9 is a diagram schematically illustrating differences of the driving operation between the operation modes in the first embodiment. [1] In boost operation of the downlink signal DS, the voltage after the boost is set to Vs1 in the normal mode, whereas the voltage after the boost is set to Vs2 (<Vs1) in the low power consumption mode. [2] In transmission operation of the downlink signal DS, the transmission rate is set to R1 in the normal mode, whereas the transmission rate is set to R2 (<R1) in the low power consumption mode. [3] In frequency hopping operation of the downlink signal DS, frequency hopping is set to "ON" in the normal mode, whereas frequency hopping is set to "OFF" in the low power consumption mode. [4] In reception operation of the uplink signal US, reception is set to "ON"

(bidirectional mode) in the normal mode, whereas reception is set to "OFF" (unidirectional mode) in the low power consumption mode.

[5] In wireless communication operation, wireless communication is set to "ON" in the normal mode, whereas wireless communication is set to "OFF" in the low power consumption mode. [6] In writing pressure detection operation of the active pen 12A, detection is set to "ON" in the normal mode, whereas detection is set to "OFF" in the low power consumption mode. [7] In angle detection operation of the active pen 12A, angle detection is set to "ON" in the normal mode, whereas angle detection is set to "OFF" in the low power consumption mode. [8] In acceptance operation of operation of the pen switch 74, operation is set "valid" in the normal mode, whereas operation is set "invalid" in the low power consumption mode. [9] In writing operation of data, writing is "permitted" in the normal mode, whereas writing is "limited" in the low power consumption mode.

The change in the above-described driving parameter is not limited to change in only one driving parameter and may be simultaneously performed for a combination of two or more driving parameters as long as contradiction is not caused technically. Moreover, the low power consumption mode may be set depending on the level of the power remaining amount (that is, remaining amount level). In this case, the number of changes in the driving parameter may be increased in a stepwise manner according to the remaining amount level.

Summarization of First Embodiment

As above, the position detection system 10A in the first embodiment includes the electronic equipment 14A including the touch sensor 16 of the capacitive system obtained by disposing a plurality of sensor electrodes in a planar manner, and the active pen 12A used with the electronic equipment 14A. The active pen 12A includes the receiving circuit (here, pen-side receiving circuit 46) that receives the uplink signal US from the electronic equipment 14A and the transmitting circuit (that is, pen-side transmitting circuit 48) that transmits the downlink signal DS to the electronic equipment 14A. The active pen 12A includes also the attendant function circuit 50 that performs an attendant function different from reception of the uplink signal US and transmission of the downlink signal DS and the controller (here, pen-side MCU 40) that controls operation of the pen-side receiving circuit 46, the pen-side transmitting circuit 48, or the attendant function circuit 50 according to the plurality of kinds of operation modes including the normal mode and the low power consumption mode.

The normal mode is the operation mode in which the power consumption accompanying the specific driving operation relating to at least one of reception of the uplink signal US, transmission of the downlink signal DS, and the attendant functions is relatively high (for example, operation mode in which the occurrence rate of performance of the specific driving operation is relatively high or the performance amount of the specific driving operation is relatively large). The low power consumption mode is the operation mode in which the power consumption accompanying the specific driving operation is relatively low (for example, operation mode in which the occurrence rate of performance of the specific driving operation is relatively low or the performance amount of the specific driving operation is relatively small).

Because the configuration is made in this manner, various functions according to the status of the power remaining amount of the active pen 12A can be performed. Specifically, the operating time of the active pen 12A can be made longer by selecting the normal mode when the power remaining amount is large and selecting the low power consumption mode when the power remaining amount is small.

Furthermore, when the specific driving operation is boost operation of the downlink signal DS, the pen-side MCU 40 may control the boost operation by the pen-side transmitting circuit 48 in such a manner that [1] the transmission voltage of the downlink signal DS is boosted to a first voltage in the normal mode and [2] the downlink signal DS is boosted to a second voltage lower than the first voltage or the boost of the downlink signal DS is stopped in the low power consumption mode.

Moreover, when the specific driving operation is boost operation of the downlink signal DS formed of a plurality of rectangular pulses, the pen-side MCU 40 may control the boost operation by the pen-side transmitting circuit 48 in such a manner that [1] the degree of blunting of the rising or falling in the rectangular pulses of the boosted downlink signal DS becomes relatively low in the normal mode and [2] the degree of blunting of the rising or falling in the rectangular pulses of the boosted downlink signal DS becomes relatively high in the low power consumption mode.

Furthermore, when the specific driving operation is transmission operation of the downlink signal DS, the pen-side MCU 40 may control the transmission operation by the pen-side transmitting circuit 48 in such a manner that [1] the occurrence rate of transmission of the downlink signal DS becomes relatively high in the normal mode and [2] the occurrence rate of transmission of the downlink signal DS becomes relatively low in the low power consumption mode.

Moreover, when the specific driving operation is frequency hopping operation in which frequency hopping to switch the transmission frequency of the downlink signal DS is performed, the pen-side MCU 40 may control the frequency hopping operation by the pen-side transmitting circuit 48 in such a manner that [1] the occurrence rate of switching of the transmission frequency is set relatively high to continue the frequency hopping in the normal mode and [2] the occurrence rate of switching of the transmission frequency is set relatively low to continue the frequency hopping or the frequency hopping is stopped in the low power consumption mode.

Furthermore, when the specific driving operation is transmission operation in which the downlink signal DS is transmitted with switching of the clock frequency relating to generation or transmission of the downlink signal DS, the pen-side MCU 40 may control the transmission operation by the pen-side transmitting circuit 48 in such a manner that [1] the downlink signal DS is transmitted at a relatively high clock frequency in the normal mode and [2] the downlink signal DS is transmitted at a relatively low clock frequency in the low power consumption mode.

Moreover, when the specific driving operation is reception operation of the uplink signal US, the pen-side MCU 40 may control the reception operation by the pen-side receiving circuit 46 in such a manner that [1] reception of the uplink signal US is continued in the normal mode and [2] the uplink signal US is intermittently received or reception of the uplink signal US is made invalid in the low power consumption mode.

Furthermore, in the low power consumption mode, the pen-side MCU 40 may control the transmission operation by the pen-side transmitting circuit 48 to transmit the downlink signal DS at a predetermined transmission cycle while reception of the uplink signal US is made invalid.

Moreover, the attendant function includes at least one of the communication function to perform communication with the electronic equipment 14A by a system different from the active capacitance type system, the writing pressure detection function to detect the writing pressure that acts on the pen tip of the active pen 12A, the operation detection function to detect the operation state of the switch of the active pen 12A, the vibration function to vibrate the active pen 12A, and the writing function to write data supplied from the electronic equipment 14A to the memory. In this case, the pen-side MCU 40 may perform operation control of the attendant function circuit 50 in such a manner that [1] the attendant function is continued in the normal mode and [2] the attendant function is intermittently performed or performance of the attendant function is stopped in the low power consumption mode.

Furthermore, the pen-side MCU 40 may cause behavior triggered by reception of the uplink signal US to be different between the case in which the normal mode is being performed and the case in which the low power consumption mode is being performed.

Moreover, the electronic equipment 14A may select the operation mode of the active pen 12A on the basis of the remaining amount of the power supply (here, power supply module 30) mounted in the active pen 12A and generate the mode flag indicating the operation mode. In this case, the pen-side MCU 40 acquires the mode flag through reception from the electronic equipment 14A and makes switching to the normal mode or the low power consumption mode to perform it according to the value of the mode flag.

Moreover, the pen-side MCU 40 may make switching to the normal mode or the low power consumption mode to perform it on the basis of the remaining amount of the power supply (here, power supply module 30) mounted in the active pen 12A. In this case, the pen-side transmitting circuit 48 transmits the downlink signal DS including the mode flag indicating the operation mode in performance to the electronic equipment 14A.

Second Embodiment

Subsequently, a position detection system 10B in a second embodiment will be described with reference to FIG. 10 to FIG. 18. The position detection system 10B corresponds to one mode of the position detection system 10 illustrated in FIG. 1. This position detection system 10B includes an active pen 12B and electronic equipment 14B.
Internal Configuration of Electronic Equipment 14B FIG. 10 is a diagram illustrating one example of an internal configuration of the electronic equipment 14B in the second embodiment. This electronic equipment 14B includes the touch sensor 16, a sensor-side controller 18b, and the host processor 34.

The touch sensor 16 is a sensor of a capacitive system (more specifically, mutual capacitance system) obtained by disposing a plurality of sensor electrodes 16X and 16Y in a planner manner. The touch sensor 16 includes the plurality of sensor electrodes 16X for detecting the position in an X-direction (X-coordinate) and the plurality of sensor electrodes 16Y for detecting the position in a Y-direction (Y-coordinate). The linear sensor electrodes 16X are disposed to extend in the Y-direction and are disposed separately from each other at equal intervals along the X-direction. The linear sensor electrodes 16Y are disposed to extend in the X-direction and are disposed separately from each other at equal intervals along the Y-direction. Furthermore, the sensor electrodes 16X and 16Y are insulated from each other by the interposition of an insulating substrate (not illustrated) composed of glass or resin.

The sensor-side controller 18b is connected to the touch sensor 16 and includes a micro controller (hereinafter, a sensor-side MCU 100), a logic circuit 101, sensor-side transmitting circuits 102 and 103, a sensor-side receiving circuit 104, and a selector circuit 105.

The sensor-side MCU 100 and the logic circuit 101 control transmission-reception operation of the sensor-side controller 18b by controlling the sensor-side transmitting circuits 102 and 103, the sensor-side receiving circuit 104, and the selector circuit 105. The sensor-side MCU 100 is a controller that reads out a program from its own memory and executes the program to selectively perform, for example, [1] operation of supplying a pixel driving voltage Vcom to the selector circuit 105, [2] operation of controlling the sensor-side transmitting circuit 102 to transmit a finger detection signal FDS, [3] operation of controlling the sensor-side receiving circuit 104 to receive the finger detection signal FDS, [4] operation of controlling the sensor-side transmitting circuit 103 to transmit the uplink signal US to the active pen 12B, and [5] operation of controlling the sensor-side receiving circuit 104 to receive the downlink signal DS from the active pen 12B. Moreover, the logic circuit 101 is configured to generate control signals of the sensor-side transmitting circuits 102 and 103, the sensor-side receiving circuit 104, and the selector circuit 105 according to control by the sensor-side MCU 100.

When the downlink signal DS is a "position signal" indicating the position of the active pen 12B, the sensor-side MCU 100 calculates position coordinates (x, y) of the active pen 12B on a touch surface from the reception intensity at each of the plurality of sensor electrodes 16X and 16Y and outputs the position coordinates (x, y) to the host processor 34. On the other hand, when the downlink signal DS is a "data signal" including transmission data, the sensor-side MCU 100 acquires response data Res (specifically, unique identification (ID), writing pressure, on/off information of a pen switch, or the like) included in this data signal and outputs the response data Res to the host processor 34.

The sensor-side transmitting circuit 102 generates the finger detection signal FDS according to control by the sensor-side MCU 100 and supplies the finger detection signal FDS to each sensor electrode 16X through the selector circuit 105. For example, the finger detection signal FDS is configured by K signals $s_1$ to $s_K$ each composed of K pulses represented by "1" or "−1." The n-th (n=1 to K) pulse of each of the signals $s_1$ to $s_K$ configures a pulse group pn. The pulses configuring one pulse group pn are input to the respective sensor electrodes 16X in parallel from the sensor-side transmitting circuit 102 through the selector circuit 105.

The sensor-side transmitting circuit 103 has a function of generating the uplink signal US according to control by the sensor-side MCU 100 and the logic circuit 101. Specifically, the sensor-side transmitting circuit 103 includes a code sequence retaining section 110, a spreading processing section 111, and a transmission guard section 112.

The code sequence retaining section 110 has a function of generating and retaining a spreading code with a predetermined chip length having a self-correlation characteristic on the basis of a control signal ctrl_t3 supplied from the logic circuit 101. The spreading code retained by the code sequence retaining section 110 is supplied to the spreading processing section 111.

The spreading processing section 111 has a function of acquiring a transmission chip sequence with the predetermined chip length by modulating the spreading code retained by the code sequence retaining section 110 on the basis of a command COM supplied through the sensor-side MCU 100. The spreading processing section 111 supplies the acquired transmission chip sequence to the selector circuit 105 through the transmission guard section 112.

The transmission guard section 112 has a function of inserting a guard period (that is, a period in which neither transmission nor reception is performed) necessary for switching of transmission operation and reception operation between a transmission period of the uplink signal US and a reception period of the downlink signal DS on the basis of a control signal ctrl_t4 supplied from the logic circuit 101.

The sensor-side receiving circuit 104 receives the finger detection signal FDS transmitted by the sensor-side transmitting circuit 102 or the downlink signal DS transmitted by the active pen 12B, on the basis of a control signal ctrl_r of the logic circuit 101. Specifically, the sensor-side receiving circuit 104 includes an amplifier circuit 115, a detection circuit 116, and an analog-to-digital (AD) converter 117.

The amplifier circuit 115 amplifies the finger detection signal FDS or the downlink signal DS supplied from the selector circuit 105 and outputs the amplified signal. The detection circuit 116 generates a voltage corresponding to the level of the output signal of the amplifier circuit 115. The AD converter 117 generates a digital signal by sampling the voltage output from the detection circuit 116 at predetermined time intervals. The digital signal output by the AD converter 117 is supplied to the sensor-side MCU 100.

The selector circuit 105 is connected to the touch sensor 16 and performs switch operation according to control signals from the logic circuit 101. Specifically, the selector circuit 105 includes two switches 118x and 118y and two electrode selection circuits 119x and 119y.

The switch 118x is configured in such a manner that a common terminal is connected to any one of a T1-terminal, a T2-terminal, an R-terminal, and a D-terminal. The switch 118y is configured in such a manner that a common terminal is connected to either one of an R-terminal and a T-terminal. The common terminal of the switch 118x is connected to the electrode selection circuit 119x. The T1-terminal of the switch 118x is connected to an output end of the sensor-side transmitting circuit 102. The T2-terminal of the switch 118x is connected to an output end of the sensor-side transmitting circuit 103. The R-terminal of the switch 118x is connected to an input end of the sensor-side receiving circuit 104. The D-terminal of the switch 118x is connected to an output end of the sensor-side MCU 100. The common terminal of the switch 118y is connected to the electrode selection circuit 119y. The T-terminal of the switch 118y is connected to the output end of the sensor-side transmitting circuit 103. The R-terminal of the switch 118y is connected to the input end of the sensor-side receiving circuit 104.

The electrode selection circuit 119x is a switch element for selectively connecting the plurality of sensor electrodes 16X to the common terminal of the switch 118x. That is, the electrode selection circuit 119x is configured to be capable of simultaneously connecting at least some of the plurality of sensor electrodes 16X to the common terminal of the switch 118x. The electrode selection circuit 119y is a switch element for selectively connecting the plurality of sensor electrodes 16Y to the common terminal of the switch 118y. That is, the electrode selection circuit 119y is configured to be capable of simultaneously connecting at least some of the plurality of sensor electrodes 16Y to the common terminal of the switch 118y.

Four control signals sTRx, sTRy, selX, and selY are supplied from the logic circuit 101 to the selector circuit 105. Specifically, the control signals sTRx, STRy, selX, and selY are supplied to the switch 118x, the switch 118y, the electrode selection circuit 119x, and the electrode selection circuit 119y, respectively. The logic circuit 101 performs switching control of the selector circuit 105 through the four control signals sTRx, sTRy, selX, and selY. This causes selective performance of [1] transmission and reception of the finger detection signal FDS or [2] transmission of the uplink signal US and reception of the downlink signal DS.

The host processor 34 is configured by a computation processing device including a central processing unit (CPU), a graphics processing unit (GPU), and a micro-processing unit (MPU). The host processor 34 plays a role in executing an operating system of the electronic equipment 14B, various applications such as drawing software, or the like by executing a program stored in a memory that is not illustrated. Included in the drawing software are a function of generating stroke data on the basis of coordinates sequentially supplied from the sensor-side controller 18b and performing rendering and displaying on a display and a function of adjusting the result of the rendering on the basis of data such as a writing pressure value supplied from the sensor-side controller 18b (for example, a function of adjusting the line width according to the writing pressure value).

Functional Block Diagram

Figure 11:
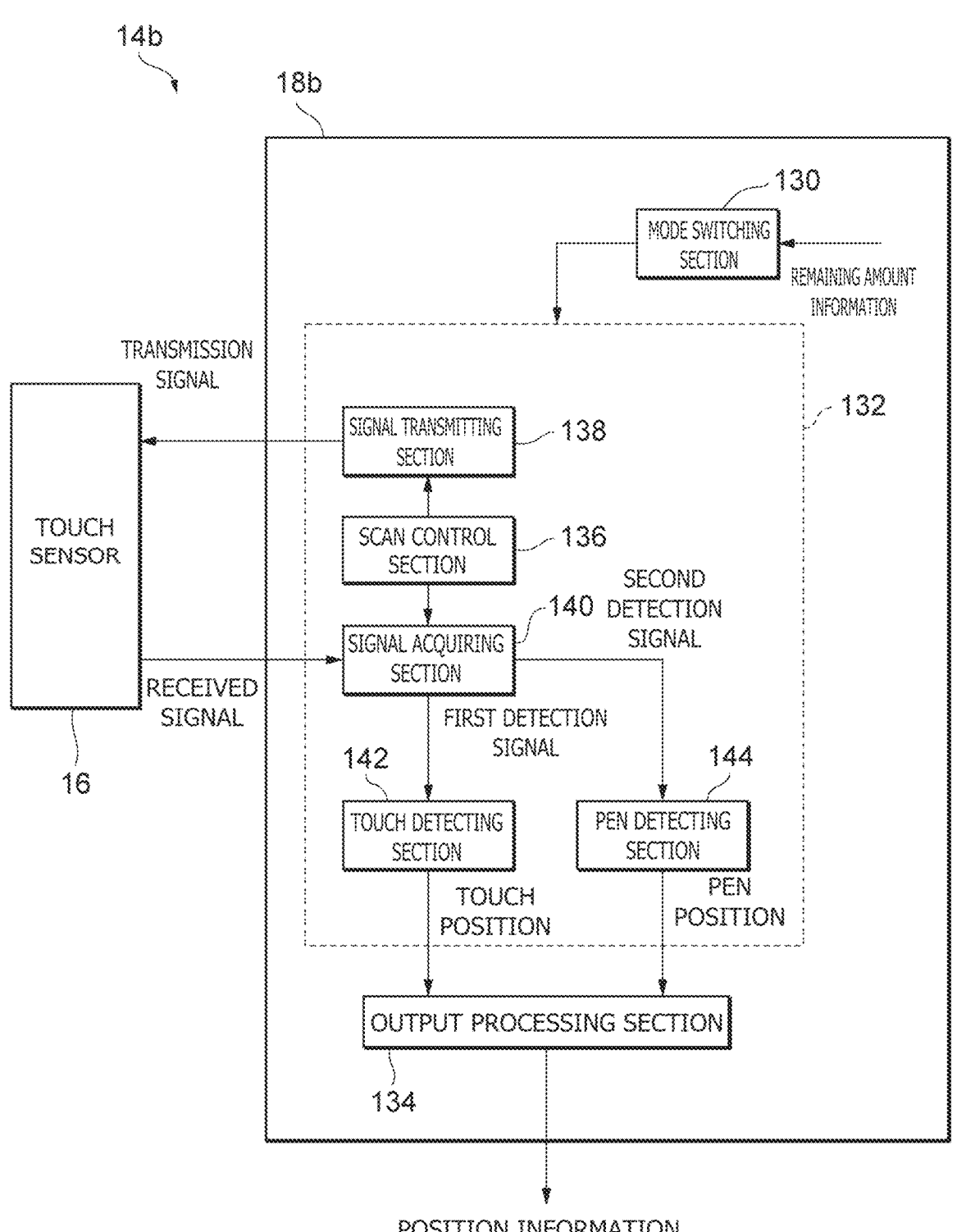
FIG. 11 is a functional block diagram relating to a sensor-side controller illustrated in FIG. 10.

FIG. 11 is a functional block diagram relating to the sensor-side controller 18b illustrated in FIG. 10. The sensor-side controller 18b includes a mode switching section 130, a position detecting section 132, and an output processing section 134.

The mode switching section 130 makes switching among a plurality of kinds of operation modes obtained by combining a touch scan or a pen scan and performs the operation mode. As in the first embodiment, the kinds of operation modes are classified into [1] the "first operation mode group" in which the operation mode is switched according to a detection result of the active pen 12B or a passive pointer or [2] the "second operation mode group" in which the operation mode is switched according to the remaining amount of a power supply disposed in the active pen 12B. As in the first embodiment, the STP mode or the exclusive mode is included in the first operation mode group, and the normal mode or the low power consumption mode is included in the second operation mode group.

In the second embodiment, the low power consumption mode is classified into [1] an "active mode" in which pen functions of the active pen 12B are kept and [2] a "passive mode" for stopping transmission of the downlink signal DS and causing the active pen 12B to function as the passive pointer. In performance of the active mode or the passive mode, the sensor-side controller 18b performs at least one of [1] fallback operation, [2] priority-to-touch operation, [3] shift-to-passive operation, [4] pseudo activation operation, and [5] signal reflection operation. Each operation will be described in detail later.

The mode switching section 130 refers to remaining amount information supplied from the active pen 12B and selects the operation mode according to the magnitude relation between the power remaining amount and a threshold settled in advance. This "remaining amount information" means a quantitative value or qualitative value indicating the remaining amount of the power supply of the active pen 12B. For example, the mode switching section 130 selects the "normal mode" when the current power remaining amount is greater than the threshold (50%), whereas the mode switching section 130 selects the "low power consumption mode" when the current power remaining amount is equal to or less than the threshold. Two or more remaining amount thresholds may be set, and the low power consumption mode (or sub-mode) in which the power consumption becomes lower as the power remaining amount becomes lower may be selected in a stepwise manner.

The position detecting section 132 detects the position of the active pen 12B or the passive pointer (for example, a finger F in FIG. 10) according to the operation mode selected by the mode switching section 130. The position detecting section 132 performs driving operation while changing a driving parameter relating to the specific driving operation according to the selected operation mode. As one example of the "specific driving operation," various kinds of operation relating to [1] transmission operation of the uplink signal US, [2] reception operation of the downlink signal DS, [3] angle calculation operation of the active pen 12B, or [4] scan operation of the touch sensor 16 are cited.

Specifically, the position detecting section 132 includes a scan control section 136, a signal transmitting section 138, a signal acquiring section 140, a touch detecting section 142, and a pen detecting section 144.

The scan control section 136 repeatedly performs a plurality of kinds of scan processing in a time-sharing manner through the touch sensor 16. Included in the plurality of kinds of scan processing are [1] the "touch scan" for detecting the passive pointer (for example, the finger F) that does not transmit a signal and [2] the "pen scan" for detecting the active pen 12B that transmits the downlink signal DS. The touch scan and the pen scan may be performed at a ratio of 1:1 or may be performed at a ratio of n:m (n≠m).

The above-described touch scan is performed for detecting change in the capacitance in the sensor electrodes 16X and 16Y. For example, this touch scan may be [1] a scan based on the "mutual capacitance system" in which change in the mutual capacitance between the sensor electrodes 16X and 16Y is detected by transmitting the finger detection signal FDS from the sensor electrode 16X and receiving this signal FDS by the sensor electrode 16Y or may be [2] a scan based on the "self-capacitance system" in which change in the capacitance of each of the sensor electrodes 16X and 16Y is detected.

The scan control section 136 performs scan operation according to the driving parameter corresponding to the operation mode selected by the mode switching section 130. As one example of the driving parameter, [1] the length of a time slot assigned to the touch scan (hereinafter, referred to also as "touch time length"), [2] the length of a time slot assigned to the pen scan (hereinafter, referred to also as "pen time length"), or the like is cited.

The signal transmitting section 138 transmits a desired signal for performing the touch scan or the pen scan from the sensor electrodes 16X and 16Y according to transmission control by the scan control section 136. In performance of the touch scan, the signal transmitting section 138 generates the finger detection signal FDS for detecting the finger F and outputs this finger detection signal FDS to the transmitting electrode (here, one or more sensor electrodes 16X) to transmit the finger detection signal FDS. In performance of the pen scan, the signal transmitting section 138 generates the uplink signal US for detecting the active pen 12B and outputs this uplink signal US to the transmitting electrode (here, one or more sensor electrodes 16X and 16Y) to transmit the uplink signal US.

The signal transmitting section 138 performs transmission operation of the uplink signal US according to the driving parameter corresponding to the operation mode selected by the mode switching section 130. As one example of the driving parameter, [1] validity/invalidity of transmission, [2] the transmission voltage (voltage value, whether or not a boost is made), [3] the occurrence rate of transmission of the uplink signal US, or the like is cited. In this "invalidation of transmission," stop of generation of the uplink signal US or stop of transmission operation is included.

The signal acquiring section 140 receives or acquires a desired signal for performing the touch scan or the pen scan from the sensor electrodes 16X and 16Y according to reception control by the scan control section 136. In performance of the touch scan, the signal acquiring section 140 receives the finger detection signal FDS from the transmitting electrode from the receiving electrode (here, one or more sensor electrodes 16Y) and acquires a detection signal (or first detection signal) for detecting presence/absence of the finger F or the position of the finger F. In performance of the pen scan, the signal acquiring section 140 receives the downlink signal DS from the active pen 12B from the receiving electrode (here, one or more sensor electrodes 16X and 16Y) and acquires a detection signal (or second detection signal) for detecting presence/absence of the active pen 12B or the position of the active pen 12B.

The signal acquiring section 140 performs reception operation of the downlink signal DS according to the driving parameter corresponding to the operation mode selected by the mode switching section 130. As one example of the driving parameter, [1] validity/invalidity of reception, [2] the occurrence rate of reception of the downlink signal DS, or the like is cited. In this "invalidation of reception," stop of reception operation or stop of processing of received data is included.

The touch detecting section 142 performs various kinds of signal processing for the first detection signal acquired by the signal acquiring section 140 and detects presence/absence of the passive pointer or the position of the passive pointer (hereinafter, collectively referred to also as a "touch position"). Included in this signal processing is [1] "threshold processing" to detect presence/absence of the finger F according to the magnitude relation between a signal value of each position indicated by signal distribution and a threshold, [2] "identification processing" to identify the type (for example, the finger F, the palm, or another object) of touch on the basis of the size or the shape of an area detected by the threshold processing, or [3] "position calculation processing" to calculate the touch position through performing interpolation computation or approximation computation for the signal distribution.

The pen detecting section 144 performs various kinds of signal processing for the second detection signal acquired by the signal acquiring section 140 and detects presence/absence of the active pen 12B or the position of the active pen 12B (hereinafter, collectively referred to also as a "pen position"). Included in this signal processing is [1] "threshold processing" to detect presence/absence of the active pen 12B according to the magnitude relation between the signal level of each position indicated by signal distribution and a threshold or [2] "position calculation processing" to detect the pen position through performing interpolation computation or approximation computation for the signal distribution.

The pen detecting section 144 performs detection operation of the pen position according to the driving parameter corresponding to the operation mode selected by the mode switching section 130. As one example of the driving parameter, a threshold used for threshold processing, or the like, is cited.

The output processing section 134 generates position information including the pen position or the touch position calculated by the position detecting section 132 and then outputs data including the position information to the host processor 34 (FIG. 10). The output processing section 134 may output the data at a cycle settled in advance (for example, 120 Hz). In this data, besides the position information of the active pen 12B, [1] information (for example, pen ID, writing pressure, on/off information of a pen switch, or the like) provided from the active pen 12B, [2] information (for example, an inclination angle, an orientation, speed, an acceleration) calculated from the position information, or [3] identification information of the operation mode that is being currently performed may be included.

The output processing section 134 is configured to be capable of outputting the data according to the driving parameter corresponding to the operation mode selected by the mode switching section 130. As one example of the driving parameter, [1] the presence or absence of each data item, [2] the occurrence rate of output of data, or the like is cited.

Description of Operation

Figure 12:
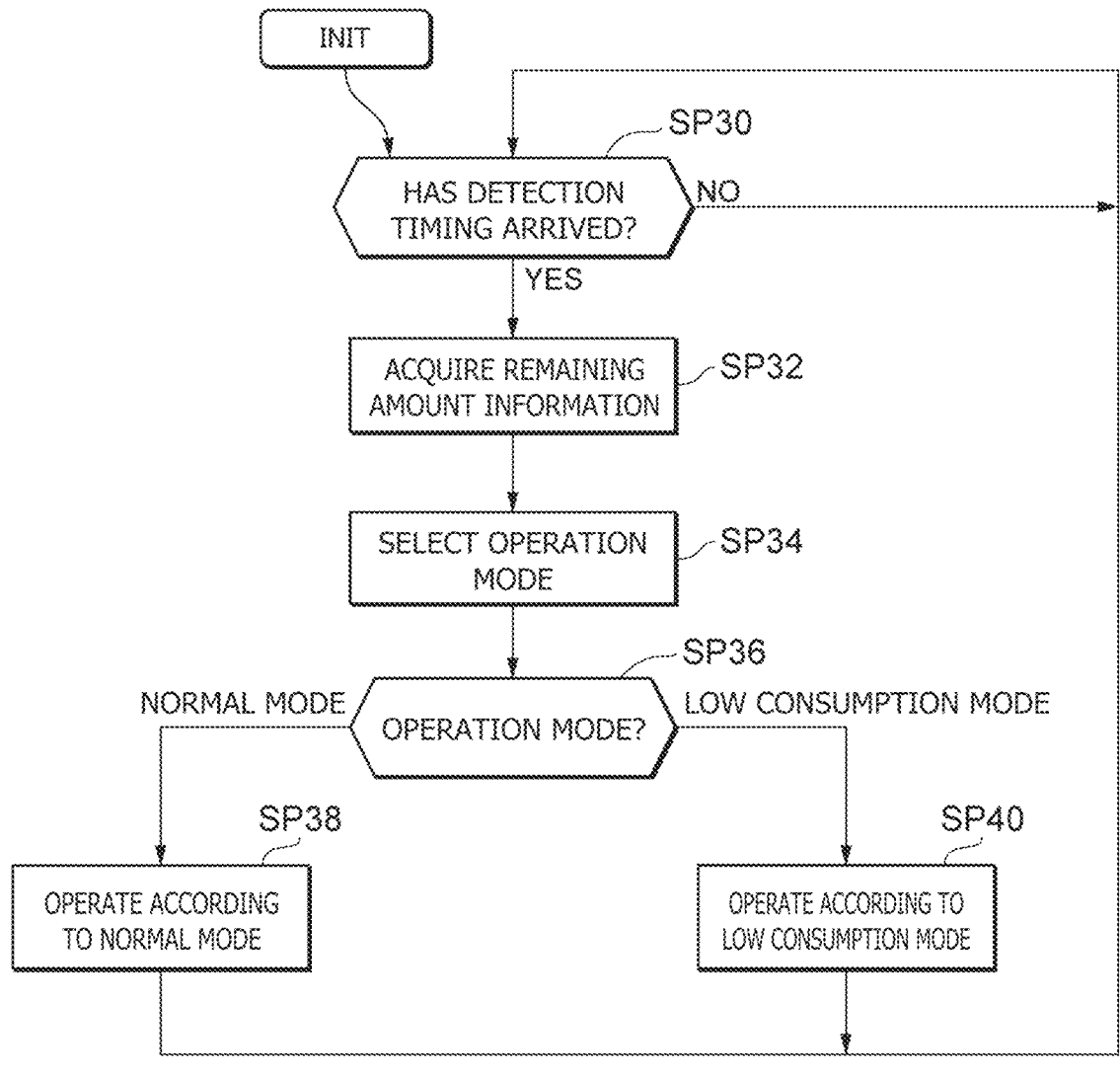
FIG. 12 is a flowchart illustrating one example of mode switching operation by the sensor-side controller in FIG. 10 and FIG. 11.

The position detection system 10B in the second embodiment is configured as above. Subsequently, operation by the position detection system 10B will be described with reference to FIG. 12 to FIG. 18. FIG. 12 is a flowchart illustrating one example of mode switching operation by the sensor-side controller 18*b* in FIG. 10 and FIG. 11.

At SP30 in FIG. 12, the sensor-side controller 18*b* checks whether or not a detection timing has arrived. When a detection timing has not yet been reached (SP30: NO), the sensor-side controller 18*b* remains at SP30 until a detection timing arrives. On the other hand, when a detection timing has arrived (SP30: YES), the sensor-side controller 18*b* proceeds to the next SP32.

At SP32, the mode switching section 130 acquires the most recent power remaining amount supplied from the active pen 12B.

At SP34, the mode switching section 130 selects the operation mode that should be performed from the power remaining amount acquired in SP32.

At SP36, the mode switching section 130 checks the operation mode selected in SP34. When the normal mode has been selected (SP36: normal mode), the mode switching section 130 supplies the mode flag indicating the "normal mode" to the position detecting section 132 and proceeds to the next SP38.

In SP38, the position detecting section 132 performs detection processing of the active pen 12B according to the normal mode. Thereafter, the sensor-side controller 18*b* returns to SP30 and repeatedly performs SP30, SP32, SP34, SP36, and SP38 while the normal mode continues.

When a return to SP36 is made and the low power consumption mode has been selected (SP36: low power consumption mode), the mode switching section 130 supplies the mode flag indicating the "low power consumption mode" to the position detecting section 132 and proceeds to the next SP40.

In SP40, the position detecting section 132 performs detection processing of the active pen 12B according to the low power consumption mode. Thereafter, the sensor-side controller 18*b* returns to SP30 and repeatedly performs SP30, SP32, SP34, SP36, and SP40 while the low power consumption mode continues.

In this manner, the sensor-side controller 18*b* performs the detection operation of the active pen 12B in real time by repeatedly performing SP30 to SP40 in FIG. 12.

Specific Examples of Low Power Consumption Mode

Subsequently, specific examples of the low power consumption mode will be described with reference to FIG. 13 to FIG. 18.

First Example: Fallback Operation

As a first example of the low power consumption mode, the fallback operation of the position detection system 10B will be described. This "fallback operation" means operation of keeping operation of the active pen 12B in the state in which the function or performance of the position detection system 10B is partly stopped.

Figures 13, 14:
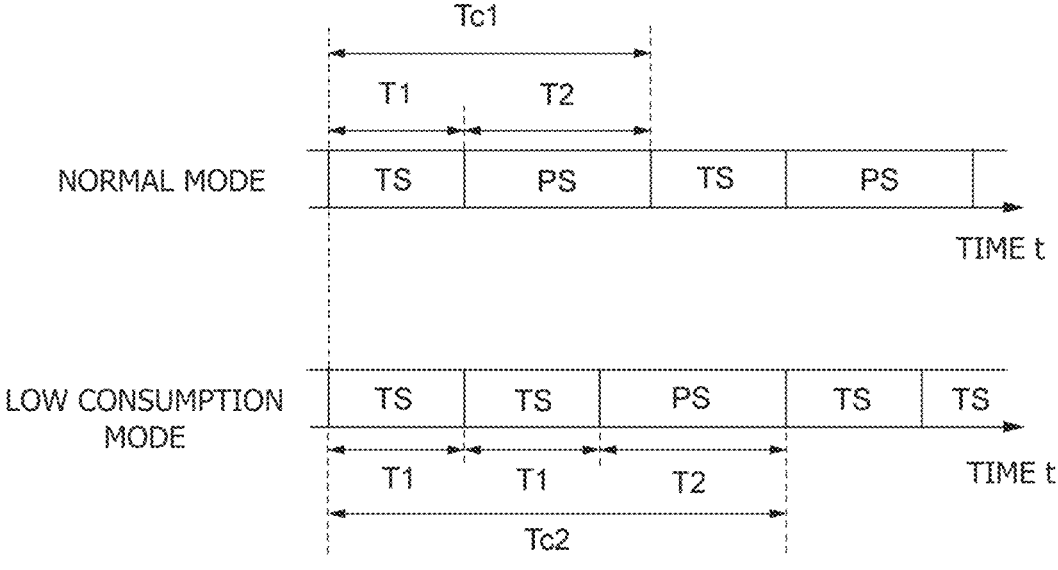
FIG. 13 is a diagram schematically illustrating first differences of the driving operation between the operation modes in the second embodiment.
FIG. 14 is a diagram schematically illustrating second differences of the driving operation between the operation modes in the second embodiment.

FIG. 13 is a diagram illustrating a first example of comparison of the driving operation between the normal mode and the low power consumption mode. [1] In transmission operation of the uplink signal US, transmission is set to "ON" in the normal mode, whereas transmission is set to "OFF" in the low power consumption mode. [2] In reception operation of the downlink signal DS, reception is set to "ON" in the normal mode, whereas reception is set to "OFF" in the low power consumption mode. [3] In threshold determination operation of the reception level, the threshold is set to Th1 in the normal mode, whereas the threshold is set to Th2 (<Th1) in the low power consumption mode. [4] In angle detection operation of the active pen 12B, detection is set to "ON" in the normal mode, whereas detection is set to "OFF" in the low power consumption mode.

The change in the above-described driving parameter is different in some cases depending on [1] whether the current mode is the active mode or the passive mode or [2] behavior of the active pen 12B in the low power consumption mode. For example, in the low power consumption mode, transmission of the uplink signal US or reception of the downlink signal DS may be set to "ON." In this case, the active pen 12B can implement the low power consumption mode by voluntarily stopping transmission of the downlink signal DS or stopping transmission of the downlink signal DS corresponding to the uplink signal US through interruption of detection of the uplink signal US.

Second Example: Priority-to-Touch Operation

As a second example of the low power consumption mode, the priority-to-touch operation of the position detection system 10B will be described. This "priority-to-touch operation" means operation of giving priority to the touch scan when the touch scan and the pen scan are performed in a time-sharing manner.

FIG. 14 is a diagram illustrating a second example of comparison of the driving operation between the normal mode and the low power consumption mode. More specifically, FIG. 14 schematically illustrates the time schedule of scan operation by the scan control section 136 in FIG. 11. Rectangles in the drawing correspond to time slots assigned to the respective scans.

The normal mode is an operation mode for performing one time of touch scan (TS) and one time of pen scan (PS) in a time-sharing manner. A time length of T1 (unit: ms) is assigned to the time slot of the touch scan. A time length of T2 (unit: ms) is assigned to the time slot of the pen scan. That is, [1] one time of touch scan whose time length is T1 and [2] one time of pen scan whose time length is T2 configure one operation unit (cycle: Tc1=T1+T2).

The low power consumption mode corresponds to the operation mode in which two times of touch scan (TS) and one time of pen scan (PS) are performed in a time-sharing manner. The time length of T1 (unit: ms) is assigned to the time slot of the touch scan. The time length of T2 (unit: ms) is assigned to the time slot of the pen scan. That is, [1] two times of touch scan whose time length is 2·T1 and [2] one time of pen scan whose time length is T2 configure one operation unit (cycle: Tc2=2·T1+T2).

Here, when the pen output rates in the normal mode and the lowv consumption mode are defined as R1 and R2 [Hz], respectively, R1 and R2 are obtained according to the following expressions (1) and (2).

$$R1 = 1000/Tc1 = 1000/(T1 + T2) \tag{1}$$

$$R2 = 1000/Tc2 = 1000/(2 \cdot T1 + T2) \tag{2}$$

Here, when T2 is a positive value, a relation of R1>R2 is satisfied. As above, by preferentially performing the touch scan in the low power consumption mode, the occurrence rate of response by the active pen 12B relatively lowers, and thus, the power consumption of the active pen 12B is correspondingly suppressed.

Third Example: Shift-to-Passive Operation

As a third example of the low power consumption mode, the shift-to-passive operation of the position detection system 10B will be described. This "shift-to-passive operation" means operation for causing the active pen 12B to function as the "passive pointer."

Figure 15:
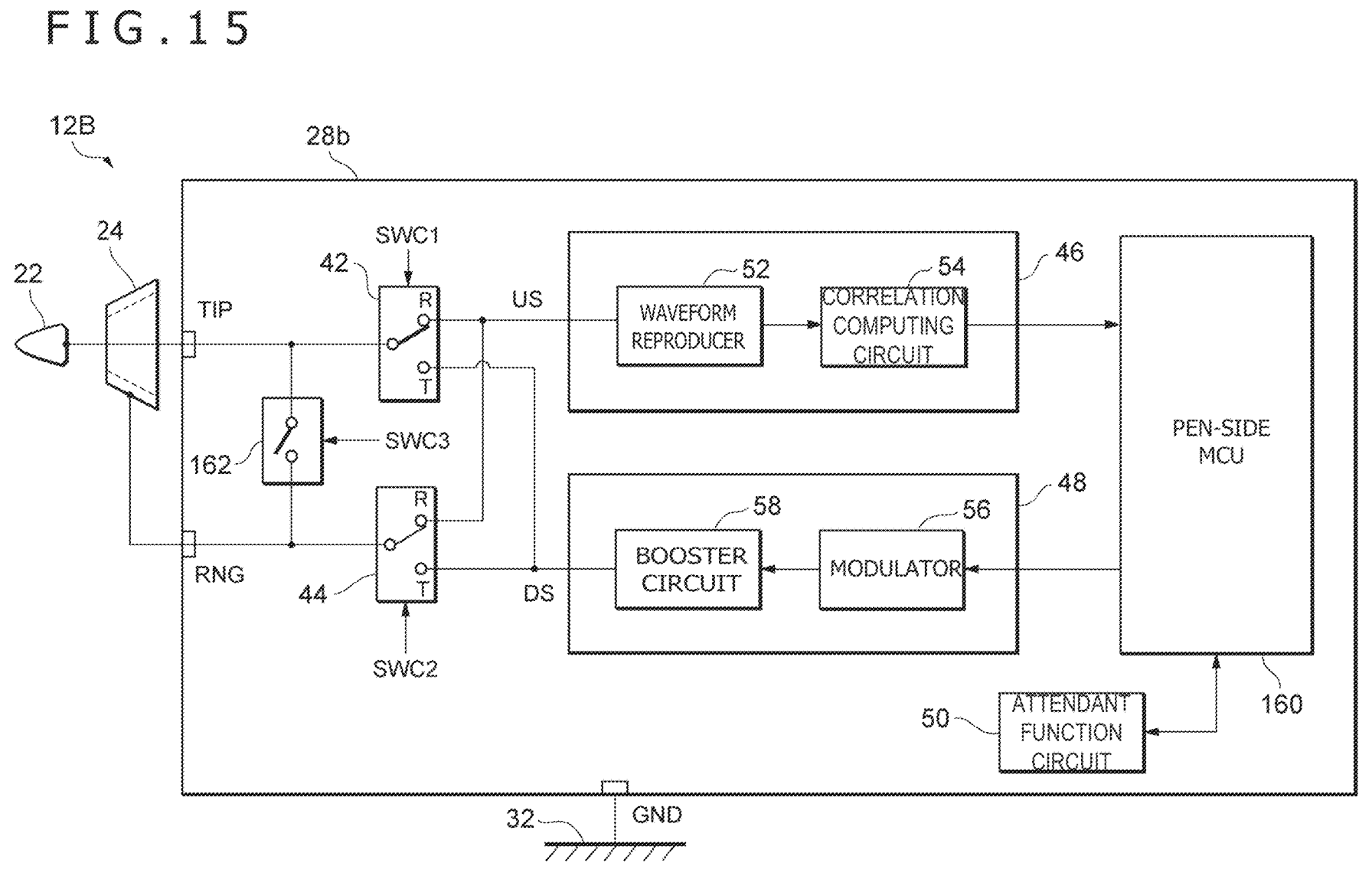

FIG. 15 is a first block diagram of a pen-side controller 28b of the active pen 12B in the second embodiment. Disposed in this pen-side controller 28b are a pen-side MCU 160, the first switch 42, the second switch 44, the pen-side receiving circuit 46, the pen-side transmitting circuit 48, the attendant function circuit 50, and a third switch 162.

The pen-side MCU 160 is a unit that performs comprehensive control over the respective parts of the active pen 12B, similarly to the pen-side MCU 40 illustrated in FIG. 3. The pen-side MCU 160 performs switching control of the first switch 42, the second switch 44, and the third switch 162 according to the operation mode in performance.

The third switch 162 is a switch element configured to connect the common terminal side of the first switch 42 and the common terminal side of the second switch 44. The pen-side MCU 160 supplies a third switch control signal SWC3 to the third switch 162 to perform switching control. This causes selective performance of short-circuiting of the tip electrode 22 and the ring electrode 24 and deactivation of the short-circuiting.

Subsequently, switching control associated with switching between the normal mode and the low power consumption mode will be described. In performance of the normal mode, the pen-side MCU 160 performs the switching control to cause the third switch 162 to keep the "open" state and performs operation control of the respective parts, as in the first embodiment.

Thereafter, when transition is made from the normal mode to the low power consumption mode, the pen-side MCU 160 performs the switching control to cause the first switch 42 and the second switch 44 to keep the "open" state and cause the third switch 162 to keep the "closed" state. This causes the short-circuiting of the tip electrode 22 and the ring electrode 24. The volume of the conductor part that forms capacitance with the touch sensor 16 increases. This facilitates stabilization of detection of the active pen 12B as the passive pointer.

Although the case in which the tip electrode 22 and the ring electrode 24 are short-circuited is taken as an example in FIG. 15, the configuration for the shift-to-passive operation is not limited thereto. For example, three or more pen electrodes may be short-circuited or one pen electrode and the casing 32 may be short-circuited. In the case of short-circuiting the tip electrode 22 and the casing 32, the third switch 162 is disposed between the common terminal side of the first switch 42 and a ground line connected to the casing 32.

Fourth Example: Pseudo Activation Operation

As a fourth example of the low power consumption mode, the pseudo activation operation of the position detection system 10B will be described. This "pseudo activation operation" means operation for detecting the operating state of the active pen 12B as the "active state" in a pseudo manner although the operating state of the active pen 12B is "passive."

FIG. 16 is a diagram illustrating one example of the signal waveform of the downlink signal DS. This downlink signal DS is composed of [1] a position detection signal, [2] a start signal, and [3] a data signal. The position detection signal is a burst signal for detecting the position of the active pen 12B. The start signal is a timing signal for determining the start timing of the data signal. The data signal is a signal obtained by coding data including the writing pressure value on the basis of the presence or absence of a burst signal (binary value).

For example, suppose that the sensor-side controller 18 performs common reception operation of the downlink signal DS, irrespective of which the normal mode or the low power consumption mode is selected. When the operating state of the active pen 12B is "passive," the downlink signal DS is not transmitted, and thus the active pen 12B is not detected by the sensor-side controller 18. Thus, by making contrivance regarding the circuit configuration of the sensor-side controller 18, the operating state of the active pen 12B can be detected as the "active state" in a pseudo manner although being "passive."

FIG. 17 is a diagram illustrating part of a circuit configuration for implementing the pseudo activation. A sensor-side controller 18c includes the sensor-side receiving circuit 104, a sensor-side MCU 170, an oscillator circuit 172 (equivalent to a "signal generating circuit"), and a fourth switch 174 (equivalent to a "switch").

The sensor-side MCU 170 is a unit that performs comprehensive control over the respective parts of the sensor-side controller 18c, similarly to the sensor-side MCU 100 illustrated in FIG. 10. The sensor-side MCU 170 performs switching control of the fourth switch 174 according to the operation mode in performance.

The oscillator circuit 172 generates a continuous or intermittent burst signal according to enable control by the sensor-side MCU 170. This burst signal has the same waveform shape (that is, the same time length and frequency) as the "position detection signal" of the downlink signal DS illustrated in FIG. 16.

The fourth switch 174 is a switch element disposed between the reference potential (that is, a GND) side of the sensor-side receiving circuit 104 and the output side of the oscillator circuit 172. The sensor-side MCU 170 supplies a fourth switch control signal SWC4 to the fourth switch 174 to perform switching control. This causes selective performance of connection of the sensor-side receiving circuit 104 and the oscillator circuit 172 and release of the connection.

Subsequently, switching control associated with switching between the normal mode and the low power consumption mode will be described. In performance of the normal mode, the sensor-side MCU 170 supplies an enable signal of "OFF" to the oscillator circuit 172 and performs the switching control to cause the fourth switch 174 to keep the "open" state.

Thereafter, when transition is made from the normal mode to the low power consumption mode, the sensor-side MCU 170 supplies the enable signal of "ON" to the oscillator circuit 172 and performs the switching control to cause the fourth switch 174 to keep the "closed" state. This causes the burst signal generated by the oscillator circuit 172 to be superimposed on the reference potential of the sensor-side receiving circuit 104. Due to this, the sensor-side MCU 170 can detect the active pen 12B in a pseudo manner by receiving the downlink signal DS in which only the position detection signal is included through the sensor-side receiving circuit 104.

Although the case in which the burst signal is superimposed on the reference potential (GND) of the sensor-side receiving circuit 104 is taken as an example in FIG. 17, the configuration for the pseudo activation operation is not limited thereto. For example, the burst signal may be superimposed on the power supply potential (Vcc) of the sensor-side receiving circuit 104. In this case, the fourth switch 174 is disposed between the Vcc side of the sensor-side receiving circuit 104 and the output side of the oscillator circuit 172.

Fifth Example: Signal Reflection Operation

As a fifth example of the low power consumption mode, the signal reflection operation of the position detection system 10B will be described. This "signal reflection operation" means operation for causing the electronic equipment 14B to detect the operating state of the active pen 12B as the "active state" in a pseudo manner through reflection of the uplink signal US by the active pen 12B.

Figure 18:
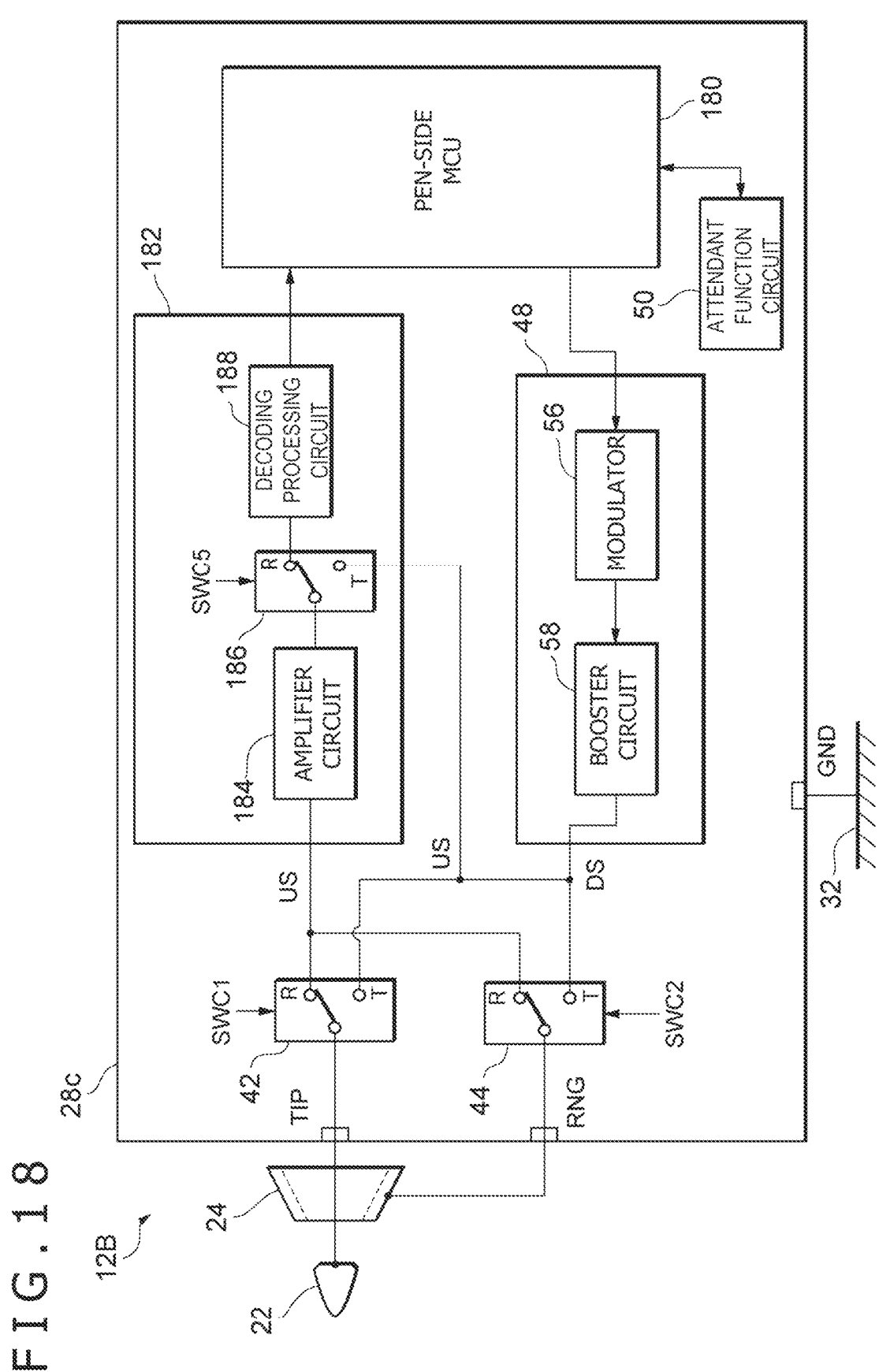
FIG. 18 is a second block diagram of the pen-side controller of the active pen in the second embodiment.

FIG. 18 is a second block diagram of a pen-side controller 28c of the active pen 12B in the second embodiment has. Disposed in this pen-side controller 28c are a pen-side MCU 180, the first switch 42, the second switch 44, a pen-side receiving circuit 182, the pen-side transmitting circuit 48, and the attendant function circuit 50.

The pen-side MCU 180 is a unit that performs comprehensive control over the parts of the active pen 12B, similarly to the pen-side MCU 40 illustrated in FIG. 3. The pen-side MCU 180 performs switching control of the first switch 42, the second switch 44, and a fifth switch 186 to be described later according to the operation mode in performance.

The pen-side receiving circuit 182 is a circuit that demodulates the uplink signal US induced to the tip electrode 22 or the ring electrode 24 and outputs data resulting from the demodulation to the pen-side MCU 180. Specifically, this pen-side receiving circuit 182 includes an amplifier circuit 184, the fifth switch 186, and a decoding processing circuit 188.

The amplifier circuit 184 is a circuit that amplifies the uplink signal US induced to the tip electrode 22 or the ring electrode 24. An input end of the amplifier circuit 184 is connected to the R-terminals of the first switch 42 and the second switch 44, and a ground end of the amplifier circuit 184 is connected to the casing 32.

The fifth switch 186 is a switch element configured in such a manner that a common terminal is connected to either one of an R-terminal and a T-terminal. The common terminal of the fifth switch 186 is connected to the amplifier circuit 184. The R-terminal of the fifth switch 186 is connected to the decoding processing circuit 188. The T-terminal of the fifth switch 186 is connected to the first switch 42 and the second switch 44. The pen-side MCU 180 supplies a fifth switch control signal SWC5 to the fifth switch 186 to perform switching control. This causes selective performance of reception and mirror transmission of the uplink signal US.

The decoding processing circuit 188 performs processing of decoding the uplink signal US amplified by the amplifier circuit 184. For example, the decoding processing circuit 188 has functions similar to those of the waveform reproducer 52 and the correlation computing circuit 54 (FIG. 3) in the first embodiment.

Subsequently, switching control associated with switching between the normal mode and the low power consumption mode will be described. In performance of the normal mode, for example, the pen-side MCU 180 performs the switching control to cause the first switch 42, the second switch 44, and the fifth switch 186 to make connection to the T-terminal, the R-terminal, and the R-terminal, respectively. This causes the pen-side controller 28c to receive the uplink signal US through the ring electrode 24 and transmit the downlink signal DS through the tip electrode 22.

Thereafter, when transition is made from the normal mode to the low power consumption mode, the pen-side MCU 180 performs the switching control to cause the first switch 42, the second switch 44, and the fifth switch 186 to make connection to the T-terminal, the R-terminal, and the T-terminal, respectively. In this case, the pen-side controller 28c causes the uplink signal US induced to the ring electrode 24 to pass through the second switch 44, the amplifier circuit 184, the fifth switch 186, and the first switch 42 and causes mirror transmission of the uplink signal US through the tip electrode 22. Owing to this, supply of data to the pen-side MCU 180 can be interrupted, and the amount of processing computation by the pen-side MCU 180 can be correspondingly reduced.

Summarization of Second Embodiment

As above, the position detection system 10B in the second embodiment includes the electronic equipment 14B including the touch sensor 16 of the capacitive system obtained by disposing the plurality of sensor electrodes 16X and 16Y in a planar manner and the active pen 12B used with the electronic equipment 14B. The active pen 12B includes the pen-side receiving circuit 46 that receives the uplink signal US from the electronic equipment 14B, the pen-side transmitting circuit 48 that transmits the downlink signal DS corresponding to the uplink signal US to the electronic equipment 14B, and the pen-side controller (here, the pen-side MCU 40, 160, or 180) that controls the driving operation by the pen-side receiving circuit 46 or the pen-side transmitting circuit 48 according to the plurality of kinds of operation modes including the normal mode and the low power consumption mode.

The normal mode is the operation mode in which transmission of the downlink signal DS is continued. The low power consumption mode is the operation mode for stopping transmission of the downlink signal DS and causing the active pen 12B to function as the passive pointer. With this configuration, various functions according to the status of the power remaining amount of the active pen 12B can be performed. Specifically, the operating time of the active pen 12B can be made longer by selecting the normal mode when the power remaining amount is large and selecting the low power consumption mode when the power remaining amount is small.

Furthermore, in the low power consumption mode, the pen-side MCU 40 may voluntarily stop transmission of the downlink signal DS or stop transmission of the downlink signal DS corresponding to the uplink signal US through interruption of detection of the uplink signal US.

Moreover, when the active pen 12B further includes the two or more pen electrodes (here, the tip electrode 22 and the ring electrode 24) for receiving the uplink signal US or transmitting the downlink signal DS, and the switch (here, the third switch 162) disposed between connecting lines that connect the two or more pen electrodes to each other, the pen-side MCU 160 may perform the switching control to cause the third switch 162 to become the open state in the normal mode and cause the third switch 162 to become the closed state in the low power consumption mode.

Furthermore, when the active pen 12B further includes the casing 32 that houses at least the pen-side receiving circuit 46, the pen-side transmitting circuit 48, and the pen-side MCU 160, the pen electrode (here, the tip electrode 22 or the ring electrode 24) for receiving the uplink signal US or transmitting the downlink signal DS, and the switch disposed between connecting lines that connect the pen electrode and the casing 32, the pen-side MCU 160 may perform the switching control to cause the switch to become the open state in the normal mode and cause the switch to become the closed state in the low power consumption mode.

Moreover, when the electronic equipment 14B further includes the sensor-side controller 18b that controls the driving operation of the touch sensor 16, the sensor-side controller 18b may perform common reception operation of the downlink signal DS, irrespective of which of the normal mode and the low power consumption mode is selected.

Furthermore, the sensor-side controller 18b may include the sensor-side receiving circuit 104 that receives the downlink signal DS through the sensor electrodes 16X and 16Y, the signal generating circuit (here, the oscillator circuit 172) that generates a simulated signal imitating the downlink signal DS, the switch (here, the fourth switch 174) disposed between the reference potential side of the sensor-side receiving circuit 104 and the output side of the oscillator circuit 172 or between the power supply potential side of the sensor-side receiving circuit 104 and the output side of the oscillator circuit 172, and the sensor-side controller (here, the sensor-side MCU 170) that performs the switching control to cause the fourth switch 174 to become the open state in the normal mode and cause the fourth switch 174 to become the closed state in the low power consumption mode.

Moreover, when the active pen 12B further includes the switch (here, the fifth switch 186) that switches the output destination of the pen-side receiving circuit 46 to the pen-side MCU 180 or the pen-side transmitting circuit 48, the pen-side MCU 180 may perform the switching control to cause the output destination of the fifth switch 186 to be connected to the pen-side MCU 180 in the normal mode and cause the output destination of the fifth switch 186 to be connected to the pen-side transmitting circuit 48 in the low power consumption mode.

Third Embodiment

Figure 19:
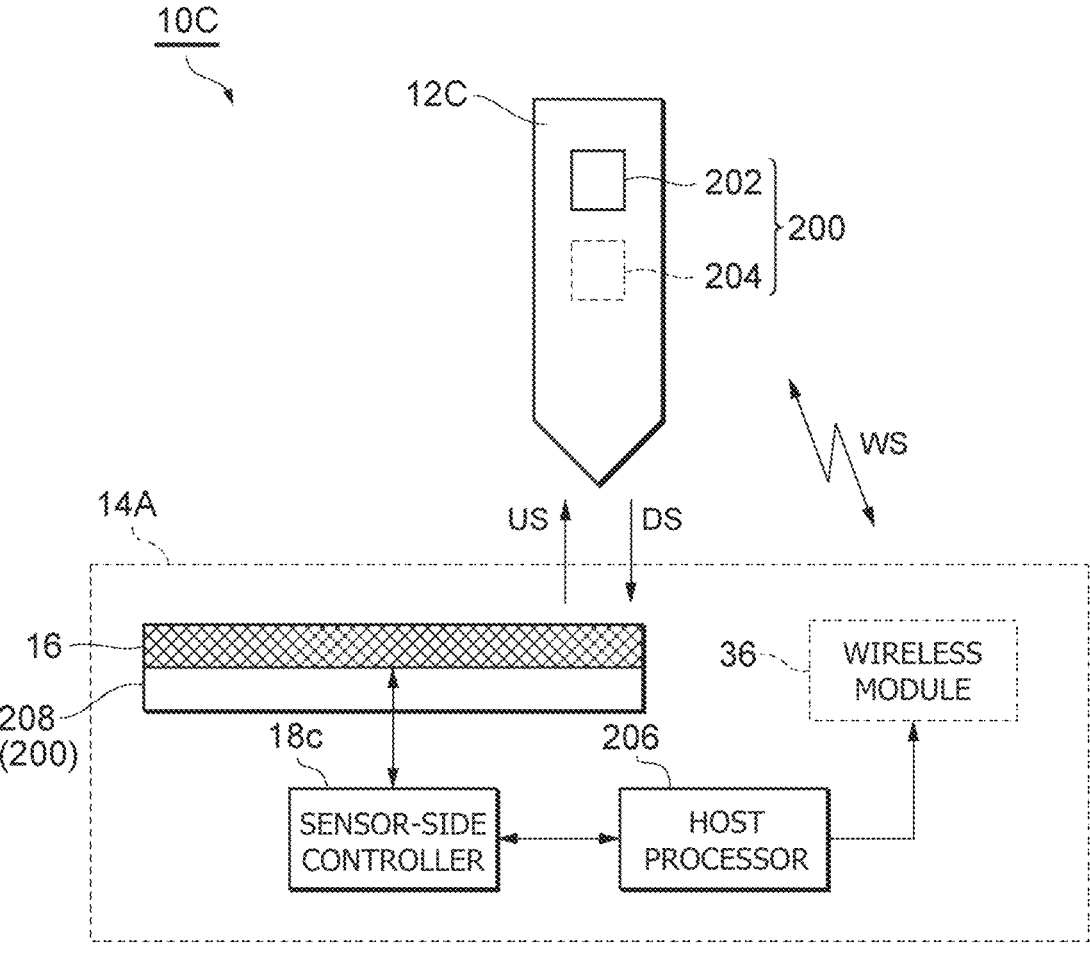
FIG. 19 is a schematic configuration diagram of a position detection system in a third embodiment.

Subsequently, a position detection system 10C in a third embodiment will be described with reference to FIG. 19 to FIG. 21. The position detection system 10C corresponds to one mode of the position detection system 10 illustrated in FIG. 1. This position detection system 10C includes an active pen 12C and electronic equipment 14C.
Configuration and Operation FIG. 19 is a schematic configuration diagram of the position detection system 10C in the third embodiment. At least one of the active pen 12C and the electronic equipment 14C is equipped with an informing circuit 200 that explicitly or implicitly informs a user that the remaining amount of a power supply of the active pen 12C is small.

For example, the active pen 12C has an internal configuration similar to that in the first embodiment (the active pen 12A) or the second embodiment (the active pen 12B). In the example of FIG. 19, the active pen 12C further includes an output device 202 of an exposed type and an output device 204 of a built-in type. Here, the output devices 202 and 204 corresponds to the above-described informing circuit 200.

The output device 202 of an exposed type outputs visible information that appeals to the visual sense of the user. For example, the output device 202 is formed of a display panel or a lamp. As one example of the display panel, a transmissive liquid crystal panel, reflective liquid crystal panel, organic electro luminescence (EL) panel, electronic paper, or the like is cited. In particular, use of the electronic paper can keep the contents of display while supply of power is stopped in the low power consumption mode.

The output device 204 of a built-in type outputs audible information that appeals to the auditory sense of the user or touchable information that appeals to the tactile sense of the user. For example, the output device 204 is formed of a sound generator including a speaker or a vibration device including a vibrator. As one example of output sound, a buzzer, jingle, music, audio guidance, or the like is cited.

For example, the electronic equipment 14C has an internal configuration similar to that in the first embodiment (electronic equipment 14A) or the second embodiment (electronic equipment 14B). In the example of FIG. 19, the electronic equipment 14C includes the touch sensor 16, the sensor-side controller 18c, the wireless module 36 with an optional configuration, a host processor 206, and a display panel 208. Here, the display panel 208 corresponds to the above-described informing circuit 200. As one example of the display panel, a liquid crystal panel, organic EL panel, electronic paper, or the like is cited.

Subsequently, informing operation associated with switching between the normal mode and the low power consumption mode will be described. Hereinafter, the state in which the power remaining amount is greater than a threshold will be referred to as a "normal state," and the state in which the power remaining amount is equal to or less than the threshold will be referred to as a "low remaining amount state." In the third embodiment, the state in which the normal mode is being performed is equivalent to the "normal state," and the state in which the low power consumption mode is being performed is equivalent to the "low remaining amount state."

The position detection system 10C does not perform informing by the informing circuit 200 in performance of the normal mode, whereas the position detection system 10C explicitly or implicitly performs informing by the informing circuit 200 in performance of the low power consumption mode. That is, the informing circuit 200 starts informing to the user with transition from the normal mode to the low power consumption mode being the trigger, and the informing circuit 200 ends informing to the user with transition from the low power consumption mode to the normal mode being the trigger.

Here, the "explicit informing" means giving awareness to the user by performing, in the low power consumption mode, output of various kinds of information that is not performed in the normal mode. As one example of the "explicit informing," display of a message, display of a remaining amount gauge, lighting/blinking of a lamp, output of an informing sound, generation of vibrations, or the like is cited. Furthermore, the "implicit informing" means giving awareness to the user by making the output mode of various kinds of information different depending on whether the operation mode is the normal mode or the low power consumption mode. As one example of the "implicit informing," making the display mode of a cursor 214 (FIG. 20) displayed on the electronic equipment 14C different is cited.

Figure 20:
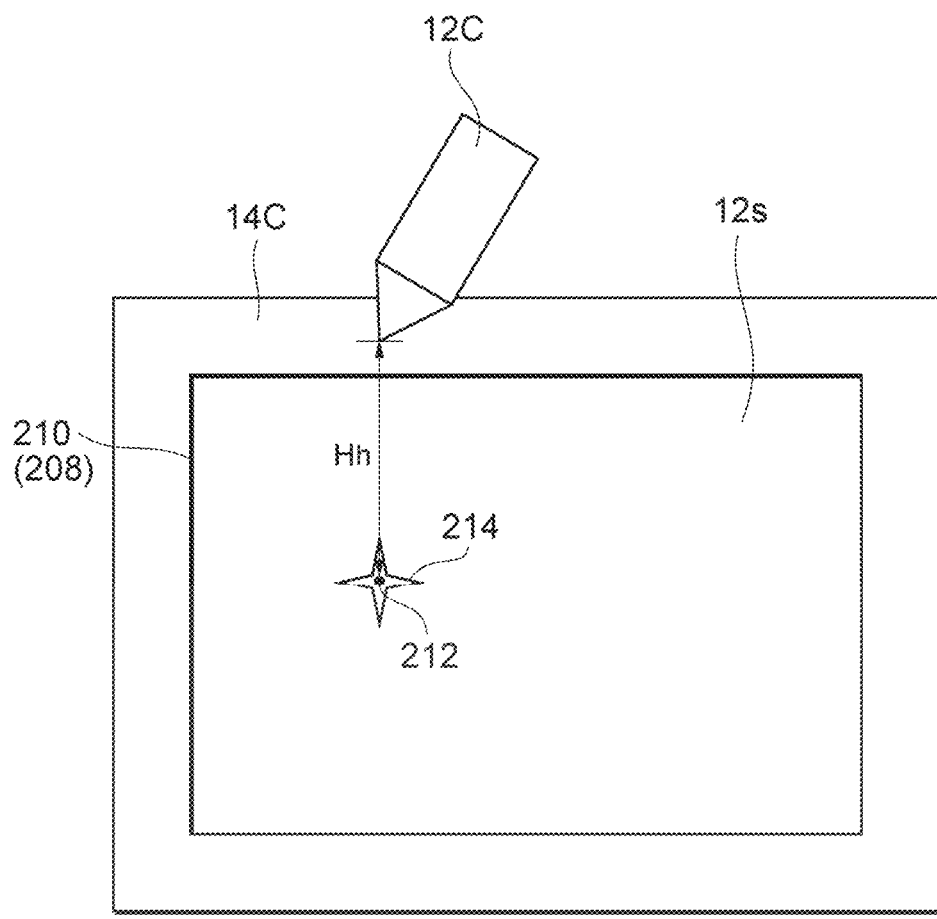
FIG. 20 is a diagram illustrating one example of a display method of the position at which an active pen in FIG. 19 is present.

FIG. 20 is a diagram illustrating one example of the display method of the position at which the active pen 12C in FIG. 19 is present. The electronic equipment 14C is configured to display the cursor 214 (equivalent to a "mark") indicating a position 212 of the active pen 12C in a display area 210 of the display panel 208 in association with approach of the active pen 12C. Specifically, the cursor 214 is not displayed when the height of the active pen 12C based on a touch surface 12s (hereinafter, referred to also as a "hover height Hh") is higher than a height threshold, whereas the cursor 214 is displayed when the hover height Hh has become lower than the height threshold.

Figure 21:
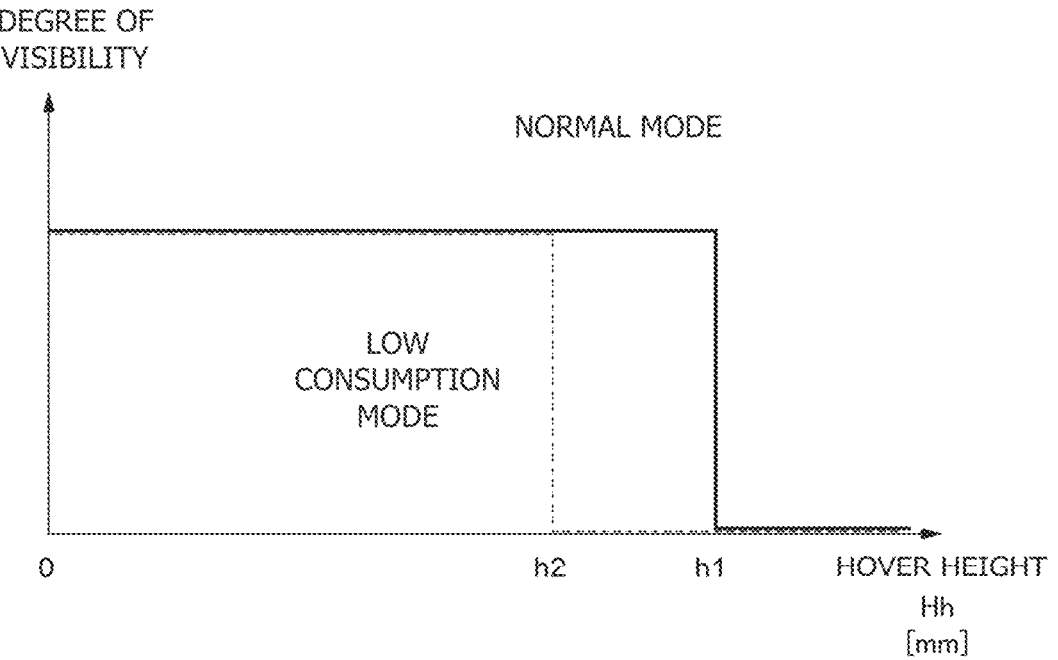
FIG. 21 is a diagram illustrating one example of a method for changing the display mode of a cursor.

FIG. 21 is a diagram illustrating one example of the method for changing the display mode of the cursor 214. The abscissa axis of the graph indicates the hover height Hh (unit: mm), and the ordinate axis of the graph indicates the degree of visibility of the cursor 214. This degree of visibility is defined in such a manner that the visibility becomes higher as the value becomes larger whereas the visibility becomes lower as the value becomes smaller. The degree of visibility with the zero value indicates the state in which the user is incapable of visually recognizing the cursor 214 (that is, an undisplayed state of the cursor 214). For example, the degree of visibility is adjusted based on various modes including [1] the brightness and the saturation of a color, [2] the size and the shape, or [3] the presence or absence of a contour line, regarding the cursor 214.

Here, the height threshold is set to h1 in the normal mode (illustrated by a solid line), whereas the height threshold is set to h2 in the low power consumption mode (illustrated by a dashed line). Here, because a magnitude relation of h1>h2 is satisfied, the appearance sensitivity of the cursor 214 is relatively low in the low power consumption mode. That is, the user can recognize the lowering of the power remaining amount of the active pen 12C through the lowering of the appearance sensitivity of the cursor 214 in association with transition from the normal mode to the low power consumption mode.

Although description has been made by taking as an example the case in which the height threshold is changed according to the operation mode in performance in FIG. 21, the rendition effect of the display mode is not limited to this form. For example, with the height threshold made constant, the cursor 214 may be displayed in such a manner that the degree of visibility is gradually made higher as the value of the hover height Hh becomes smaller. Even when the degree of visibility of the cursor 214 is transiently changed, the lowering of the power remaining amount of the active pen 12C can be implicitly informed.

Moreover, actually, the active pen 12C or the electronic equipment 14C is not equipped with a ranging sensor that measures the hover height Hh. Thus, for this threshold determination, [1] the reception intensity of the uplink signal US or [2] the reception intensity of the downlink signal DS, which is a physical quantity correlating with the hover height Hh, is used, instead of the hover height Hh. In this case, the change in the display mode illustrated in FIG. 21 can be reproduced by, in the low power consumption mode, relatively lowering the sensitivity of reception of the uplink signal US by the active pen 12C or the sensitivity of reception of the downlink signal DS by the electronic equipment 14C.

Summarization of Third Embodiment

As above, the position detection system 10C in the third embodiment includes the electronic equipment 14C including the touch sensor 16 of the capacitive system obtained by disposing a plurality of sensor electrodes in a planar manner, the active pen 12C used with the electronic equipment 14C, and the informing circuit 200 that is disposed in the electronic equipment 14C or the active pen 12C and that explicitly or implicitly informs a user that the remaining amount of the power supply disposed in the active pen 12C is small.

The active pen 12C includes the receiving circuit (here, the pen-side receiving circuit 46) that receives the uplink signal US from the electronic equipment 14C, and the transmitting circuit (that is, the pen-side transmitting circuit 48) that transmits the downlink signal DS to the electronic equipment 14C. The active pen 12C includes also the attendant function circuit 50 that performs an attendant function different from reception of the uplink signal US and transmission of the downlink signal DS, and the controller (here, the pen-side MCU 40) that controls operation of the pen-side receiving circuit 46, the pen-side transmitting circuit 48, or the attendant function circuit 50 according to the plurality of kinds of operation modes including the normal mode and the low power consumption mode.

By equipping the electronic equipment 14C or the active pen 12C with the informing circuit 200 as above, informing the user can be performed when the power remaining amount of the active pen 12c has become small, and the user can be prompted to take a countermeasure such as a charge or replacement of the power supply.

Furthermore, when the informing circuit 200 is the display panel 208 that displays the cursor 214 at the position 212 indicated by the active pen 12C, the display panel 208 may display the mark (here, the cursor 214) according to the magnitude relation between the distance between the active pen 12C and the touch sensor 16 or a physical quantity correlating with the distance and the first threshold in the normal state (or in performance of the normal mode), and display the cursor 214 according to the magnitude relation between the distance or the physical quantity and the second threshold smaller than the first threshold in the low remaining amount state (or in performance of the low power consumption mode).

Moreover, when the informing circuit 200 is the display panel 208 that displays the cursor 214 at the position 212 indicated by the active pen 12C, the display panel 208 may make the display mode of the mark (here, the cursor 214) different in the normal state and the low remaining amount state.

Furthermore, when the informing circuit 200 is the output device 202 or 204 disposed in the active pen 12C, the output device 202 or 204 may output information that appeals to the visual sense, the auditory sense, or the tactile sense in the low remaining amount state. Moreover, the output device 202 may be electronic paper that displays visible information.

Other Embodiments

The following countermeasures may be taken when the power remaining amount of the active pen 12 has become small.

As a first countermeasure, adding a power supply of the active pen 12 is conceivable. Specifically, the active pen 12 may be configured to be usable with switching from the power supply module 30 (FIG. 2) that is a main power supply to a sub-power supply such as a solar cell. Alternatively, the active pen 12 may be equipped with a vibration-powered generator that can generate electricity by vibrations of the pen main body.

As a second countermeasure, making a mechanical structure that allows operation even when the power remaining amount is small is conceivable. Specifically, the active pen 12 may be equipped with a position adjustment mechanism (for example, a screw adjustment mechanism) that moves a pen electrode for transmitting the downlink signal DS to cause the pen electrode to come close to the pen tip. Alternatively, the active pen 12 may be equipped with a refill module for increasing the capacitance or the signal intensity.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An active pen used with an electronic equipment including a plurality of sensor electrodes, the active pen comprising:
   a receiving circuit that, in operation, receives an uplink signal from the electronic equipment;
   a transmitting circuit that, in a first operation mode, transmits a first downlink signal at a first voltage to the electronic equipment and, in a second operation mode, transmits a second downlink signal at a second voltage different from the first voltage to the electronic equipment, wherein the first voltage and the second voltage are selected from a plurality of voltages; and
   a controller that, in operation, controls the transmitting circuit to transmit, to the electronic equipment, a third downlink signal including information indicating a selected one of the plurality of voltages including the first voltage and the second voltage.

2. The active pen according to claim 1, wherein the uplink signal from the electronic equipment indicates which operation mode the active pen is to operate in.

3. The active pen according to claim 2, wherein the controller, in operation, makes switching to the first operation mode or to the second operation mode according to the uplink signal.

4. The active pen according to claim 1, wherein the first operation mode is a normal mode and the second operation mode is a low power consumption mode.

5. The active pen according to claim 1, wherein the controller, in operation, generates a flag regarding the first operation mode or the second operation mode and controls the transmitting circuit to transmit the flag to the electronic equipment.

6. The active pen according to claim 1, comprising:
   a pen electrode that, in operation, transmits the first downlink signal or the second downlink signal.

7. An integrated circuit configured to control operation of an active pen used with an electronic equipment including a plurality of sensor electrodes, the integrated circuit comprising:
   a receiving circuit that, in operation, controls receiving an uplink signal from the electronic equipment;
   a transmitting circuit that, in a first operation mode, controls transmitting a first downlink signal at a first voltage to the electronic equipment and, in a second operation mode, controls transmitting a second downlink signal at a second voltage different from the first voltage to the electronic equipment, wherein the first voltage and the second voltage are selected from a plurality of voltages; and
   a control circuit that, in operation, controls the transmitting circuit to transmit, to the electronic equipment, a third downlink signal including information indicating a selected one of the plurality of voltages including the first voltage and the second voltage.

8. The integrated circuit according to claim 7, wherein the uplink signal from the electronic equipment indicates which operation mode the active pen is to operate in.

9. The integrated circuit according to claim 8, wherein the control circuit, in operation, makes switching to the first operation mode or to the second operation mode according to the uplink signal.

10. The integrated circuit according to claim 7, wherein the first operation mode is a normal mode and the second operation mode is a low power consumption mode.

11. The integrated circuit according to claim 7, wherein the control circuit, in operation, generates a flag regarding the first operation mode or the second operation mode and controls the transmitting circuit to transmit the flag to the electronic equipment.

12. A position detection system comprising:
   an electronic equipment including a plurality of sensor electrodes; and
   an active pen including:
      a receiving circuit that, in operation, receives an uplink signal from the electronic equipment;
      a transmitting circuit that, in a first operation mode, transmits a first downlink signal at a first voltage to the electronic equipment and, in a second operation mode, transmits a second downlink signal at a second voltage different from the first voltage to the electronic equipment, wherein the first voltage and the second voltage are selected from a plurality of voltages; and a controller that, in operation, controls the transmitting circuit to transmit, to the electronic equipment, a third downlink signal including information indicating a selected one of the plurality of voltages including the first voltage and the second voltage.

13. The position detection system according to claim 12, wherein the uplink signal from the electronic equipment indicates which operation mode the active pen is to operate in.

14. The position detection system according to claim 13, wherein the controller of the active pen, in operation, makes switching to the first operation mode or to the second operation mode according to the uplink signal.

15. The position detection system according to claim 12, wherein the first operation mode is a normal mode and the second operation mode is a low power consumption mode.

16. The position detection system according to claim 12, wherein the controller of the active pen, in operation, generates a flag regarding the first operation mode or the second operation mode and controls the transmitting circuit to transmit the flag to the electronic equipment.

17. The position detection system according to claim 12, wherein the active pen includes:

a pen electrode that, in operation, transmits the first downlink signal or the second downlink signal.

18. The position detection system according to claim 12, wherein the electronic equipment includes a sensor-side controller that, in operation, controls a driving operation of one or more of the plurality of sensor electrodes, and the sensor-side controller, in operation, performs a common reception operation of the first downlink signal and the second downlink signal, irrespective of which operation mode the active pen is operating in.

* * * * *